US008589289B1

(12) United States Patent
O'Donnell et al.

(10) Patent No.: US 8,589,289 B1
(45) Date of Patent: Nov. 19, 2013

(54) SYSTEM, METHOD AND PROGRAM PRODUCT FOR ADMINISTERING FUND MOVEMENTS

(75) Inventors: Thomas J. O'Donnell, Bay Shore, NY (US); David Edgar Gareis, Maplewood, NJ (US)

(73) Assignee: Island Intellectual Property LLC, Manhasset, NY (US)

( * ) Notice: Subject to any disclaimer, the term of this patent is extended or adjusted under 35 U.S.C. 154(b) by 81 days.

(21) Appl. No.: 13/032,467

(22) Filed: Feb. 22, 2011

Related U.S. Application Data

(60) Provisional application No. 61/354,623, filed on Jun. 14, 2010.

(51) Int. Cl.
*G06Q 40/00* (2012.01)
(52) U.S. Cl.
USPC .............................................. 705/39; 705/35
(58) Field of Classification Search
USPC ..................................................... 705/39, 35
See application file for complete search history.

(56) References Cited

U.S. PATENT DOCUMENTS

| | | | |
|---|---|---|---|
| 4,232,367 | A | 11/1980 | Youden et al. |
| 4,346,442 | A | 8/1982 | Musmanno |
| 4,376,978 | A | 3/1983 | Musmanno |
| 4,597,046 | A | 6/1986 | Musmanno et al. |
| 4,674,044 | A | 6/1987 | Kalmus et al. |
| 4,694,397 | A | 9/1987 | Grant et al. |

(Continued)

FOREIGN PATENT DOCUMENTS

| | | |
|---|---|---|
| EP | 0 608 322 | 7/1998 |
| JP | 10-049590 A | 2/1998 |

(Continued)

OTHER PUBLICATIONS

U.S. Appl. No. 09/677,535, filed Oct. 2, 2000, Bruce Bent et al.

(Continued)

*Primary Examiner* — Thomas M Hammond, III
*Assistant Examiner* — John Scarito
(74) *Attorney, Agent, or Firm* — Foley & Lardner LLP

(57) ABSTRACT

A method, system and program product, the method comprising: accessing, one or more electronic databases, comprising: (i) aggregated account information for a plurality of government-backed insured and interest-bearing aggregated deposit accounts held in a plurality of recipient depository institutions, with one or more of the recipient depository institutions with an interest-bearing aggregated deposit account having at least one associated aggregated transaction account having an overdraft facility; and (ii) client account information for each of a plurality of the respective client accounts; obtaining client account transaction information; obtaining a respective net transfer amount for the one or more sub-periods of time for each of one or more of the respective source institutions; for at least one or more of the sub periods of time where the net transfer amount requires a first withdrawal/transfer amount selecting at least one of the recipient depository institutions that has at least one aggregated transaction account with an overdraft facility based at least in part on one or more selection rules; generating first transfer data reflecting a wire or other electronic transfer that uses the overdraft facility; generating second transfer data reflecting withdrawal/transfer by the at least one recipient depository institution of at least one second withdrawal/transfer amount in partial of full settlement of the overdraft; allocating amounts of funds from multiple of the client accounts among multiple of the recipient depository institutions to substantially match the transfer of funds; and updating one or more of the electronic databases.

35 Claims, 5 Drawing Sheets

(56) References Cited

U.S. PATENT DOCUMENTS

| | | | |
|---|---|---|---|
| 4,700,297 A | 10/1987 | Hagel et al. | |
| 4,751,640 A | 6/1988 | Lucas et al. | |
| 4,774,663 A | 9/1988 | Musmanno et al. | |
| 4,953,085 A | 8/1990 | Atkins | |
| 4,985,833 A | 1/1991 | Oncken | |
| 5,126,936 A | 6/1992 | Champion et al. | |
| 5,206,803 A | 4/1993 | Vitagliano et al. | |
| 5,220,501 A | 6/1993 | Lawlor et al. | |
| 5,235,507 A | 8/1993 | Sackler et al. | |
| 5,262,942 A | 11/1993 | Earle | |
| 5,270,922 A | 12/1993 | Higgins | |
| 5,291,398 A | 3/1994 | Hagan | |
| 5,297,032 A | 3/1994 | Trojan et al. | |
| 5,424,938 A | 6/1995 | Wagner et al. | |
| 5,631,828 A | 5/1997 | Hagan | |
| 5,644,727 A | 7/1997 | Atkins | |
| 5,649,116 A * | 7/1997 | McCoy et al. | 705/38 |
| 5,671,363 A | 9/1997 | Cristofich et al. | |
| 5,689,650 A | 11/1997 | McClelland et al. | |
| 5,710,889 A | 1/1998 | Clark et al. | |
| 5,765,144 A | 6/1998 | Larche et al. | |
| 5,774,880 A | 6/1998 | Ginsberg | |
| 5,781,654 A | 7/1998 | Carney | |
| 5,802,499 A | 9/1998 | Sampson et al. | |
| 5,806,048 A | 9/1998 | Kiron et al. | |
| 5,806,049 A | 9/1998 | Petruzzi | |
| 5,812,987 A | 9/1998 | Luskin et al. | |
| 5,826,243 A | 10/1998 | Musmanno et al. | |
| 5,848,400 A * | 12/1998 | Chang | 705/35 |
| 5,852,811 A | 12/1998 | Atkins | |
| 5,864,685 A | 1/1999 | Hagan | |
| 5,875,437 A | 2/1999 | Atkins | |
| 5,878,258 A | 3/1999 | Pizi et al. | |
| 5,878,405 A | 3/1999 | Grant et al. | |
| 5,884,285 A | 3/1999 | Atkins | |
| 5,890,141 A | 3/1999 | Carney et al. | |
| 5,893,078 A | 4/1999 | Paulson | |
| 5,903,881 A | 5/1999 | Schrader et al. | |
| 5,905,974 A | 5/1999 | Fraser et al. | |
| 5,940,809 A | 8/1999 | Musmanno et al. | |
| 5,941,996 A | 8/1999 | Smith et al. | |
| 5,946,667 A | 8/1999 | Tull, Jr. et al. | |
| 5,950,175 A | 9/1999 | Austin | |
| 5,974,390 A | 10/1999 | Ross | |
| 5,978,779 A | 11/1999 | Stein et al. | |
| 6,014,642 A | 1/2000 | El-Kadi et al. | |
| 6,016,482 A | 1/2000 | Molinari et al. | |
| 6,026,438 A | 2/2000 | Piazza et al. | |
| 6,032,133 A | 2/2000 | Hilt et al. | |
| 6,041,314 A | 3/2000 | Davis | |
| 6,044,371 A | 3/2000 | Person et al. | |
| 6,047,324 A | 4/2000 | Ford et al. | |
| 6,049,782 A | 4/2000 | Gottesman et al. | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna et al. | |
| 6,112,191 A | 8/2000 | Burke | |
| 6,119,093 A | 9/2000 | Walker et al. | |
| 6,131,810 A | 10/2000 | Weiss et al. | |
| 6,154,770 A | 11/2000 | Kostakos | |
| 6,189,785 B1 | 2/2001 | Lowery | |
| 6,192,347 B1 | 2/2001 | Graff | |
| 6,226,623 B1 | 5/2001 | Schein et al. | |
| 6,317,783 B1 | 11/2001 | Freishtat et al. | |
| 6,324,523 B1 | 11/2001 | Killeen et al. | |
| 6,363,360 B1 | 3/2002 | Madden | |
| 6,374,231 B1 | 4/2002 | Bent et al. | |
| 6,408,336 B1 | 6/2002 | Schneider et al. | |
| 6,513,020 B1 | 1/2003 | Weiss et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,124,101 B1 | 10/2006 | Mikurak | |
| 7,133,840 B1 | 11/2006 | Kenna et al. | |
| 7,203,845 B2 | 4/2007 | Sokolic et al. | |
| 7,206,761 B2 | 4/2007 | Colvin | |
| 7,216,100 B2 | 5/2007 | Elliott | |
| 7,321,874 B2 | 1/2008 | Dilip et al. | |
| 7,321,875 B2 | 1/2008 | Dilip et al. | |
| 7,328,179 B2 | 2/2008 | Sheehan et al. | |
| 7,376,606 B2 | 5/2008 | Jacobsen | |
| 7,383,223 B1 | 6/2008 | Dilip et al. | |
| 7,383,227 B2 | 6/2008 | Weinflash et al. | |
| 7,392,222 B1 | 6/2008 | Hamilton et al. | |
| 7,401,037 B2 | 7/2008 | Arena et al. | |
| 7,440,914 B2 | 10/2008 | Jacobsen | |
| 7,505,937 B2 | 3/2009 | Dilip et al. | |
| 7,509,286 B1 * | 3/2009 | Bent et al. | 705/39 |
| 7,519,551 B2 | 4/2009 | Bent et al. | |
| 7,529,709 B2 | 5/2009 | Volchek et al. | |
| 7,536,340 B2 | 5/2009 | Dheer et al. | |
| 7,536,350 B1 * | 5/2009 | Bent et al. | 705/39 |
| 7,596,522 B1 | 9/2009 | Jacobsen | |
| 7,603,307 B2 | 10/2009 | Jacobsen | |
| 7,640,199 B1 | 12/2009 | Hyland | |
| 7,657,761 B2 | 2/2010 | Sokolic et al. | |
| 7,668,771 B1 | 2/2010 | Bent et al. | |
| 7,668,772 B1 | 2/2010 | Bent et al. | |
| 7,672,886 B2 | 3/2010 | Bent et al. | |
| 7,672,901 B1 | 3/2010 | Bent et al. | |
| 7,672,902 B1 | 3/2010 | Bent et al. | |
| 7,680,716 B1 | 3/2010 | Bent et al. | |
| 7,680,734 B1 | 3/2010 | Bent et al. | |
| 7,716,131 B2 | 5/2010 | Bent et al. | |
| 7,720,755 B1 | 5/2010 | Coyle | |
| 7,729,987 B1 | 6/2010 | Wakim et al. | |
| 7,752,107 B1 | 7/2010 | Bent et al. | |
| 7,752,129 B2 | 7/2010 | Bent et al. | |
| 7,756,767 B2 | 7/2010 | Cluse et al. | |
| 7,769,688 B1 | 8/2010 | Bent et al. | |
| 7,788,235 B1 | 8/2010 | Yeo | |
| 7,797,207 B1 | 9/2010 | Dilip et al. | |
| 7,809,640 B1 | 10/2010 | Bent et al. | |
| 7,814,017 B2 | 10/2010 | Vancini et al. | |
| 7,837,100 B2 | 11/2010 | Bonalle et al. | |
| 7,860,771 B2 | 12/2010 | Colvin | |
| 7,873,571 B1 | 1/2011 | Wehmer | |
| 7,873,573 B2 | 1/2011 | Realini | |
| 7,873,677 B2 | 1/2011 | Messing et al. | |
| 7,886,969 B2 | 2/2011 | Antoo et al. | |
| 7,895,098 B2 | 2/2011 | Beard | |
| 7,895,099 B2 | 2/2011 | Whiting et al. | |
| 7,899,743 B2 | 3/2011 | Jacobsen | |
| 7,899,745 B1 | 3/2011 | Jacobsen | |
| 7,899,746 B1 | 3/2011 | Jacobsen | |
| 7,899,747 B1 | 3/2011 | Jacobsen | |
| 7,904,372 B2 | 3/2011 | Whiting et al. | |
| 7,917,433 B2 | 3/2011 | Jacobsen | |
| 7,921,057 B1 | 4/2011 | Jacobsen | |
| 7,933,821 B1 | 4/2011 | Bent et al. | |
| 7,945,511 B2 | 5/2011 | O'Brien et al. | |
| 8,015,085 B2 | 9/2011 | Blagg et al. | |
| 8,019,667 B1 | 9/2011 | Bent et al. | |
| 8,019,668 B1 | 9/2011 | Bent et al. | |
| 8,032,456 B1 | 10/2011 | Bent et al. | |
| 8,036,986 B2 | 10/2011 | Jacobsen | |
| 8,051,004 B2 | 11/2011 | Jacobsen | |
| 8,051,005 B2 | 11/2011 | Jacobsen | |
| 8,086,508 B2 | 12/2011 | Dheer et al. | |
| 8,090,651 B2 | 1/2012 | Winslow et al. | |
| 8,103,582 B1 | 1/2012 | Zettner | |
| RE43,246 E | 3/2012 | Bent et al. | |
| 8,150,766 B1 | 4/2012 | Bent et al. | |
| 8,191,156 B2 | 5/2012 | Kubo | |
| 8,239,321 B1 | 8/2012 | Bent et al. | |
| 8,260,697 B1 | 9/2012 | Bent et al. | |
| 8,260,705 B1 | 9/2012 | Bent et al. | |
| 8,290,859 B1 | 10/2012 | Bent et al. | |
| 8,290,860 B1 | 10/2012 | Bent et al. | |
| 8,290,861 B1 | 10/2012 | Bent et al. | |
| 8,311,916 B1 | 11/2012 | Bent et al. | |
| 8,311,939 B1 | 11/2012 | Bent et al. | |

| | | |
|---|---|---|
| 8,352,342 B1 | 1/2013 | Bent et al. |
| 8,355,985 B1 | 1/2013 | Bent et al. |
| 8,370,236 B1 | 2/2013 | Bent |
| 8,380,621 B1 | 2/2013 | Bent et al. |
| 8,386,382 B1 | 2/2013 | Bent |
| 8,386,383 B1 | 2/2013 | Bent |
| 8,401,962 B1 | 3/2013 | Bent |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del Rey et al. |
| 2004/0177036 A1 | 9/2004 | Nutahara et al. |
| 2004/0249741 A1 | 12/2004 | Understein |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0004655 A1* | 1/2006 | Alexander et al. ............... 705/39 |
| 2006/0047593 A1 | 3/2006 | Naratil et al. |
| 2006/0106703 A1 | 5/2006 | Del Rey et al. |
| 2006/0155644 A1 | 7/2006 | Reid et al. |
| 2006/0167773 A1 | 7/2006 | Yang et al. |
| 2006/0212389 A2 | 9/2006 | Bent et al. |
| 2006/0213980 A1 | 9/2006 | Geller et al. |
| 2006/0273152 A1 | 12/2006 | Fields |
| 2007/0043666 A1 | 2/2007 | Burdette |
| 2007/0083938 A1 | 4/2007 | Aoki et al. |
| 2007/0118449 A1 | 5/2007 | De La Motte et al. |
| 2007/0130065 A1 | 6/2007 | Staab et al. |
| 2007/0143196 A1 | 6/2007 | Colvin |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0077996 A1 | 3/2008 | Kubo |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1* | 8/2008 | Landis et al. ............... 705/39 |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1* | 1/2009 | Balachandran et al. ........ 705/34 |
| 2009/0138412 A1 | 5/2009 | Jacobsen |
| 2009/0241197 A1 | 9/2009 | Troyansky |
| 2009/0327154 A1 | 12/2009 | Van Vooren et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0106703 A1 | 5/2011 | Jay et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |
| 2013/0054429 A1 | 2/2013 | Minor et al. |

FOREIGN PATENT DOCUMENTS

| | | |
|---|---|---|
| WO | WO-95/23379 A1 | 8/1995 |
| WO | WO-99/18529 A1 | 4/1999 |
| WO | WO-02/42952-1 | 5/2002 |
| WO | WO-03/012580 A2 | 2/2003 |
| WO | WO-2005/006111 A2 | 1/2005 |

OTHER PUBLICATIONS

U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. NO. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009 Bruce Bent et al.
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
*Island Intellectual Property LLC et al. v. Deutsche Bank AG, et al.*; Memorandum and Order; Case 1:09-cv-02675-KBF; Doc. 289; Feb. 14, 2012; pp. 1-28.
*Island Intellectual Property LLC et al. v. Deutsche Bank AG, et al.*; Order; Case 1:09-cv-02675-KBF; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/453,390, filed May 8, 2009, Bruce Bent.
U.S. Appl. No. 12/622,979, filed Nov. 20, 2009, Bruce Bent et al.
U.S. Appl. No. 12/794,448, filed Jun. 4, 2010, Bruce Bent et al.
U.S. Appl. No. 12/829,961, filed Jul. 2, 2010, Bruce Bent, et al.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.

(56) References Cited

OTHER PUBLICATIONS

*Island Intellectual Property LLC et al. v. Deutsche Bank Company.Americas, et al.*; Memorandum and Order; Case 1:09-cv-02675-KBF; Doc. 265; Feb. 6, 2012; pp. 1-22.
*Island Intellectual Property LLC et al. v. Deutsche Bank Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al.v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF;.Doc. 262; Feb. 6, 2012; pp. 1-10.
*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al. v. Deutsche Bank Trust Company Americas, et al.*; Plaintiffs' Notice of Motion and Motion in Limine #3 to preclude Defendants' expert Richard T.Powers from testifying that hte Merrill Lynch CMA/ISA product includes omnibus accounts based on 17-year old double hearsay that is uncorroborated and in contravention of documentary and oral evidence of record; Case 1:09-cv-02675-KBF; Doc. 246; Jan. 30, 2012; pp. 1-2.
*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3. 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by *Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
Lawsuit by *Island Intellectual LLC et al. v. Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC v. Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC v. Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC v. First Southwest Company*; First Southwest Company's Answer to Complaint and Counterclaims; Civil Action 1:11-cv-371-SD; Jun. 20, 2011; 11 pages.
Lawsuit by *Island Intellectual Property LLC, et al. v. Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC, et al. v. Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201
Lawsuit by *Island Intellectual Property LLC, et al. v. Deutsche Bank Trust Company Americas, et al.*;Defendants Reply in Support of Their Motion in Summary Judgment of Invalidity Under 35 U.S.C. § 101; Nov. 15, 2011; Case 1:09-cv-02675-VM, Document 208.
Lawsuit by *Island Intellectual Property LLC, et al. v. Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC, et al. v. Deutsche Bank Trust Company Americas, et al.*; Order; Dec. 7, 2011; Case 1:09-cv-02675-VM, Document 212.
Lawsuit by *Island Intellectual Property LLC, et al. v. Deutsche Bank Trust Company Americas, et al.*; Special Master's Report and Recommended Decision on Defendants' Summary Judgment Motion of Invalidity Under 35 U.S.C.§ 101; Dec. 19, 2011.
Lawsuit by *Island Intellectual Property LLC, et al. v. Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; Letter to Hon. Victor Marrero re. supplement to letter of Nov. 28, 2011 on tentative rulings on claim construction in *Island Intellectual Property Trust Co., et al. v. Deutsche Bank Trust Co., et al.*, Nov. 28, 2011; Case 1:09-cv-02675-VM; Document 211.
Martens, Don W.; Letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.
Scottrade Bank Deposit Program—Terms, Conditions & Disclosures; Author unknown; 8-11; pp. 1-3.
Lawsuit by *Island Intellectual Property LLC, et al. v. Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Patent No. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988, (response to Dec. 18, 1987 letter re: proposed modifications to Merrill Lynch's CMA Program), 5 pages.
Information Statement, "Alliance Insured Account," Sep. 1999, 6 pages.
Investors Money Account$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36); Securities Act of 1933—Section2(1), Nov. 29, 1985, Kemper Financial Services, Inc., 9 pages.

(56) References Cited

OTHER PUBLICATIONS

Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998,, (attached Appendix A: Survey Questions and Responses; Appendix B: Glossary; Appendix C: Examples of Key Reserve Concepts),48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11,767,827, Date Mailed Sep. 23, 2009, 4 pages.
USPTO Office Action, Office Action Summary, U.S. Appl. No. 11,767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
I Letter to C.R. Macedo, from R.L. Rainey, Re: Promontory Interfinancial.Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (atached Q&A, Important Information about the New Salomon Smith Barney Bank Deposit Program), Aug. 16, 2002, 14 pages.

Salomon Smith Barney, "Bank Deposit Program Disclosure Statement," 3 pages.
FDIC, FDIC Law, Regulations, Related Acts—4000—Advisory Opinions, Oct. 22, 1987, J.W. Via, Jr., Counsel [online] [Retrieved on Jan. 22, 2010]. Retrieved from the Internet: URL: <http://www.fcic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <http://www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <http://www.fdic.gov/regulations/laws/rules/4000-2120.html#fdic400086-21>, 2 pages.
Merrill Lynch-Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker. Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.t
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Aryan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 Fr 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.

(56) References Cited

OTHER PUBLICATIONS

Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builder$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
U.S. Appl. No. 12/025,402, filed Feb. 4, 2008, Bent.
U.S. Appl. No. 12/794,545, filed Jun. 4, 2010, Bruce Bent et al.
U.S. Appl. No. 12/816,092, filed Jun. 15, 2010, Bruce Bent II et al.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Intern. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Intern. Ltr. LEXIS 156, Jun. 24, 1994, 3 Sheets.
Board of Governors of the Federal Reserve System, 1994 Fed. Res. Intern. Ltr. LEXIS 314, Oct. 17, 1994, 2 Sheets.
Board of Governors of the Federal Reserve System, 1994 Fed. Res. Intern. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.

(56) References Cited

OTHER PUBLICATIONS

Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D, Mar. 1, 2007, (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, Jan. 2008, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential—Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and lntrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frostl/scripts/products/product_detail.jsp?BV_. . . .

Garmhausen, "Matching Small Banks with Large Muni Deposits," American Banker, Online The Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In The Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC, Apr. 2006, 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stern, including Exhibits A, B, C, D, E and F, Nov. 12 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", Feb. 5, 2008.
Lawsuit by Carlo DeBlasio et al. against Merrill Lynch & Co., Inc. et al., Declaration of Joel P. Laitman in Support of Plaintiffs! Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, 0, P, Q and R, Nov. 14, 2007, Case No. 07-cv-318 (RJS) (Document 69).
Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC,

(56) References Cited

OTHER PUBLICATIONS

Wachovia Bank, N.A., and Wachovia Bank of Delaware, N.A., including Exhibits A, B, C and D, Nov. 14, 2007, Case No. 07-318 (RJS) (Document 67).
Lawsuit by Carlo DeBlasio et al. against Merill Lynch & Co., Inc. et al., Declaration of Scott D. Musoff in Support of The Merrill Lynch Defendants' Motion to Dismiss the Second Amended Class Action Complaint, ECF Case, Nov. 12, 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 Civ 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.
Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutional Deposits Corp. To Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772; 7,672,886; and 7,680,734; and Exhibits A-R; Civil Action No. 09 Civ. 09 Civ. 2675(VM)(AJP), Oct. 28, 2010; 1.119 pages.
Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit;'Civil Action no. 09 Civ. 2675 (VM)(AJP); Nov. 23, 2010; 192 pages.. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 Civ 4673.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).
Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

(56) References Cited

OTHER PUBLICATIONS

Lawsuit by Island Intellectual Property LLC, Lids Capital LLC, Double Rock Corporation and Intrasweep LLC against Promontory Interfinancial Network LLC, Mbsc Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).
Lawsuit by Island Intellectual Property LLC, Lids Capital Llc, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation, Island Intellectual Property LLC, Lids Capital Llc and Intrasweep LLC, Amended Complaint, Apr. 15, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.
Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LEXSEE 1985 Sec No—Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Oliver I. Ireland, Associate General Counsel, Board of Governors of the Federal Reserve System, Jun. 22, 1988, 5 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter From William W. Wiles, Secretary of the Board, Board of Governors of the Federal Reserve System, Jun. 22, 1983, 6 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of Cash: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", Jan. 30, 2009, 2 Sheets.
Merrill Lynch & You, "Financial Services the Way You Want, When You Want Them," Jan. 2000 4 Sheets.
Merrill Lynch Announces Beyond Banking, The Power of Advice for Smarter Cash Management, Jan. 8, 2 Sheets.
Merrill Lynch, Pierce, Fenner & Smith Incorporated, "Information Statement," 2000, 12 Sheets.

(56) References Cited

OTHER PUBLICATIONS

Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Fund Dealers Association, 1 page, (http://www.mfda.ca/.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD,Nov. 12, 2002, 4 Sheets.
O'Brian, "Money-Market Funds Suit Many Investors, But Proud Creator Frets About Extra Risk," Re-Printed From The Wall Street Journal, Monday, Nov. 6, 2000, Dow Jones & Company, Inc., Nov. 25, 2002, 2 Sheets.
On Wall Street, Helping Brokers Build a More Successful Business, The Power of Cash, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker; by Joe Adler, Feb. 22, 2010, 2 sheets.
Reserve Insured Deposits, United States Patent and Trademark Office, Reg. No. 2,694,910, Registered Mar. 11, 2003, 1 Sheet.
Reserve Management Corporation, Reserve Insured Deposits, Serial No. 76/315,600, Issued.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before The Financial Institutions and Consumer Credit Subcommittee House Financial Services Committee U.S. House of Representative, Hearing on H.R. 758 and H.R. 859, Mar. 5, 2003, 4 Sheets.
The Depository Trust Company. B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer The Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From The Cash Management Expert, 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.

(56) References Cited

OTHER PUBLICATIONS

Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: *Brokered Deposit Issue* vs. *Insured Savings*, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990, 1 pg.
Addendum to Insured Savings Agency Agreement, Jul. 17, 1990, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.

Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. of al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, 3 sheets.
Investors MoneyAccount$^{SM}$ (an FDIC-insured money market account), 4 sheets.
Investors MoneyAccount$^{SM}$ The FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, Fuly 17, 2009, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, *6 FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review© A Publication of *Meyer Weekly Interest Rate Survey*, A Look At Tiers, vol. II, No. 4, Apr. 1987, 6 pgs.
Interest Rate Review© A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Ded. 28, 2001, with Schedules, Exhibits, and 2001 Annual Report, 248 pgs.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, 3 sheets.
Quest Insured Account, *Information Statement*, 5 sheets.
OCC Insured Bank Deposit Account, 3 sheets.
Insured Bank Deposit Account, *Information Statement*, Jul. 1, 2000, 2 sheets.
Letter from Marilyn J. Hensle, announcing Salomon Smith Barney Bank Deposit Program.$^{SM}$, with Q&A, 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.

(56) References Cited

OTHER PUBLICATIONS

The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs:.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, Jan. 15, 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. Plus Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.leqentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, www.optionsxpress.com/welcom/faq/aq/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.

(56) References Cited

OTHER PUBLICATIONS

Update New FDIC product at IPI: Deutsche Bank Insured Deposit Program, Investment Professionals Inc, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09. htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://wwvv.royalalliance.com, Jan. 15, 2010, 1 sheet:.
Brokerage products and services, www.steemeagee.com/sali/pcg/pages/products-services.aspx, Nov. 4, 2009, 2 sheets.
Terms and conditions for cash sweep, steme agee, 2 sheets.
Client account agreement to Steme Agee Clearing, Inc, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDProqrams.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, Nov. 12, 2009, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program,www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.

(56) References Cited

OTHER PUBLICATIONS

Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage FREE Webiners, http://209.235.145/cgi-bin/websuite/tcsassnwebsite.pl?. . . , Nov. 2, 2009, 2 sheets.
Kentucky Bankers Association, Alternative for excess deposit coverage Free Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady,:Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank .insured deposit program, 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money AccountSM System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
12 CFR Part 330; Simplification of Deposit Insurance Rules; Federal Register, vol. 63 Issue 90; May 11, 1998; pp. 1-31.
U.S. Appl. No. 13/733,645, filed Jan. 3, 2013, Bent.
U.S. Appl. No. 13/735,631, filed Jan. 7, 2013, Bent.
U.S. Appl. No. 13/736,515, filed Jan. 8, 2013, Bent.
U.S. Appl. No. 13/759,434, filed Feb. 5, 2013, Bent.
U.S. Appl. No. 13/801,501, filed Mar. 13, 2013, Bent.
U.S. Appl. No. 13/801,874, filed Mar. 13, 2013, Bent.
U.S. Appl. No. 13/828,468, filed Mar. 14, 2013, Gareis.
U.S. Appl. No. 13/828,929, filed Mar. 14, 2013, Gareis.
U.S. Appl. No. 13/829,309, filed Mar. 14, 2013, O'Donnell.
U.S. Appl. No. 13/829,747, filed Mar. 14, 2013, O'Donnell.
U.S. Appl. No. 13/829,974, filed Mar. 14, 2013, Bent.
U.S. Appl. No. 13/830,143, filed Mar. 14, 2013, Bent.
U.S. Appl. No. 13/839,890, filed Mar. 15, 2013, Bent.
U.S. Appl. No. 13/840,685, filed Mar. 15, 2013, Bent.
U.S. Appl. No. 13/841,778, filed Mar. 15, 2013, Bent.
U.S. Appl. No. 13/842,360, filed Mar. 15, 2013, Bent.
U.S. Appl. No. 13/842,630, filed Mar. 15, 2013, Bent.
Campbell, Andrew, et al.; A new standard for deposit insurance and government guarantees after the crisis; Journal of Financial Regulation and Compliance, vol. 17 No. 3, 2009; pp. 210-239.
Hencke, Christopher; New Rules for FDIC Deposit Insurance; ABA Bank Compliance, Jul./Aug. 1999, 20,7; pp. 31-37.
U.S. Appl. No. 12/408,507, filed Mar. 20, 2009, Bruce Bent.
U.S. Appl. No. 12/453,387, filed May 8, 2009, Bruce Bent.
U.S. Appl. No. 12/453,388, filed May 8, 2009, Bruce Bent.
U.S. Appl. No. 12/622,979, filed Nov. 20, 2009, Bruce Bent.
U.S. Appl. No. 12/638,544, filed Dec. 15, 2009, Bruce Bent.
U.S. Appl. No. 12/794,448, filed Jun. 4, 2010, Bruce Bent.
U.S. Appl. No. 12/816,092, filed Jun. 15, 2009, Bruce Bent.
U.S. Appl. No. 13/032,456, filed Feb. 22, 2011, David Edgar Gareis.
U.S. Appl. No. 13/228,031, filed Sep. 8, 2011, Thomas O'Donnell.
U.S. Appl. No. 13/237,699, filed Sep. 20, 2011, Bruce Bent.
U.S. Appl. No. 13/248,647, filed Sep. 29, 2011, Bruce Bent.
U.S. Appl. No. 13/529,540, filed Jun. 21, 2012, Bruce Bent.
U.S. Appl. No. 13/562,961, filed Jul. 31, 2012, Bruce Bent.
U.S. Appl. No. 13/591,793, filed Aug. 22, 2012, Bruce Bent.
U.S. Appl. No. 13/591,818, filed Aug. 22, 2012, Bruce Bent.
U.S. Appl. No. 13/650,927, filed Oct. 12, 2012, David Edgar Gareis.
U.S. Appl. No. 13/651,932, filed Oct. 15, 2012, Bruce Bent.
U.S. Appl. No. 13/710,999, filed Dec. 11, 2012, Bruce Bent II.
U.S. Appl. No. 13/715,370, filed Dec. 14, 2012, Bruce Bent.
Cynamon et al.; Redefining the Monetary Aggregates: A Clean Sweep; Eastern Economic Journal, vol. 32, No. 4, Fall 2006; pp. 661-672.

\* cited by examiner

Fig. 2

TIME ↓

| | |
|---|---|
| T1 | Source Institution fund transfer data generated |
| T2 | Receipt and/or calculation by DMS of fund transfer data for a Source Instit. |
| T3 | DMS verifies net transfer amount for Source Instit. |
| T4 | DMS obtains or selects one or more Recipient Instit. and determines and allocates to each of the obtained or selected one or more respective Recipient Instit., a respective net transfer amount |
| T5 | DMS informs respective Recipient Instit. of prospective deposit/transfer or withdrawal/transfer amount |
| T6 | For a withdrawal transfer amount, DMS wires instruction to have DDA or NOW account in the Recipient Instit. wire respective withdrawal amount |
| T7 | DMS formulates fund transfer data for provision to a messenger service or other service or source to deliver or otherwise provide instruction to the respective recipient instit. for a book transfer of the respective withdrawal amount from MMDA to the DDA or NOW account of Recipient Instit. |
| T8 | Reallocate client account amounts to substantially match the fund transfer(s) and Update database with withdrawal/transfer data |
| T9 | DDA/NOW account settlement |

SYSTEM, METHOD AND PROGRAM PRODUCT FOR ADMINISTERING FUND MOVEMENTS

RELATED APPLICATIONS

This application claims priority from Provisional Application U.S. Application Ser. No. 61/354,623 filed on Jun. 14, 2010, which is incorporated herein by reference in its entirety as if fully set forth herein.

FIELD OF INVENTION

The present invention generally relates to a system, method and program product for administering fund movements, such as sweep programs. In one or more embodiments, the present invention generally relates to using overdraft facilities. In one or more embodiments, the present invention generally relates to using a method that generates data for transfers by forming depository institutions into groups based at least in part on different cutoff times for participants in the system.

SUMMARY OF ONE OR MORE EMBODIMENTS

In one or more embodiments, a method, comprises: accessing, using one or more computers, one or more electronic databases, stored on one or more computer-readable media, comprising: (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, with one or more of the recipient depository institutions with an interest-bearing aggregated deposit account having at least one associated aggregated transaction account having an overdraft facility; (ii) client account information for each of a plurality of the respective client accounts comprising at least a respective balance of funds from the respective client account held in each of one or more recipient depository institutions in the interest-bearing aggregated deposit accounts holding funds of the respective client account; obtaining client account transaction information for each of multiple of the client accounts, the client account transaction information comprising credit information and/or debit information applied to or against a respective client account for one or more sub periods of time; obtaining, using the one or more computers, a respective net transfer amount for the one or more sub-periods of time for each of one or more of the respective source institutions; selecting at least one aggregated deposit account in one or more of the depository institutions to which to deposit/transfer or to withdraw/transfer funds to or from their respective one or more aggregated deposit accounts, and comprising, for at least one or more of the sub periods of time where one or more of the net transfer amounts require a first withdrawal/transfer amount during a month period, selecting at least one of the recipient depository institutions that has at least one aggregated transaction account with an overdraft facility based at least in part on one or more selection rules; generating first transfer data reflecting a wire or other electronic transfer that uses the overdraft facility of the at least one aggregated transaction account of the at least one recipient depository institution that was selected for the first withdrawal/transfer amount, with the withdrawal/transfer of the first withdrawal/transfer amount using the respective overdraft facility to occur prior to a partial or whole settlement of that respective overdraft from the one or more respective interest-bearing aggregated deposit accounts of the at least one recipient depository institution that was selected; generating second transfer data reflecting withdrawal/transfer by the at least one recipient depository institution of at least one second withdrawal/transfer amount from the one or more interest-bearing aggregated deposit accounts in the at least one depository institution that was selected to the respective at least one aggregated transaction account in the at least recipient depository institution that was selected in partial of full settlement of the overdraft; allocating, using the one or more computers, amounts of funds from multiple of the client accounts among multiple of the recipient depository institutions, so that the respective balance of funds for the one or more sub periods of time in each of the aggregated deposit accounts of the depository institutions, after taking into consideration the fund transfer amounts for the one or more sub periods of time, will substantially match a sum of the respective balances of funds from the multiple of the respective client accounts allocated to this respective aggregated deposit account; and updating, using the one or more computers, one or more of the electronic databases to update the respective balances of client account funds held in one or more of the recipient depository institutions in one or more aggregated deposit accounts therein.

In a further embodiment, an operation is performed of selecting for the allocation from among prospective of the recipient depository institutions multiple recipient depository institutions, each with at least one respective interest-bearing aggregated deposit account and at least one respective aggregated transaction account with an overdraft facility for the withdrawal/transfer of respective first withdrawal/transfer amounts based at least in part on the one or more selection rules; and the generating first transfer data for each of the multiple recipient depository institutions, using the one or more computers.

In a further embodiment, one of the one or more selection rules comprises making a selection based at least in part on a cutoff time of the prospective recipient depository institution for fund transfers relative to one or more time thresholds or relative to the cutoff times of one or more other of the recipient depository institutions or other entities in a fund transfer chain.

In a further embodiment, one of the one or more selection rules comprise making a selection at least in part to obtaining a partial or substantially full reciprocity for source funds of the prospective recipient depository institution held in one or more of the aggregated deposit accounts held in one or more of the other recipient depository institutions.

In a further embodiment, one of the one or more selection rules comprises making a selection at least in part based on an amount of source funds of the prospective recipient depository institution held in one or more of the aggregated deposit accounts held in one or more other of the recipient depository institutions relative to an amount of source funds of another one of the recipient depository institutions held in one or more of the aggregated deposit accounts held in one or more other of the recipient depository institutions.

In a further embodiment, one of the one or more selection rules comprises making a selection at least in part based on whether an amount of client account funds of a particular one of the client accounts already held in the prospective respective recipient depository institution will exceed a threshold amount and/or client account instructions for the particular client account after the allocation.

In a further embodiment, one of the one or more selection rules comprises making a selection at least in part based on maintaining a target reciprocity for one or more of the recipient depository institutions based at least in part on an amount of source funds contributed to the program by the respective recipient depository institution.

In a further embodiment, one of the one or more selection rules comprises making a selection at least in part based on whether a prospective withdrawal/transfer or deposit/transfer will comply with a respective maximum cap and/or a respective minimum cap associated with the prospective recipient depository institution or with another of the respective recipient depository institutions.

In a further embodiment, wherein there is a reciprocity target for at least one of the recipient depository institutions, and wherein one of the one or more selection rules comprises determining whether a prospective withdrawal/transfer or a deposit/transfer will comply with a respective maximum cap and/or a respective minimum cap associated with the prospective recipient depository institution or with another of the respective recipient depository institutions, the steps of performing a pseudo-transfer of a proposed transfer of the at least one second withdrawal/transfer amount to determine whether the reciprocity target for the at least one recipient depository institution will be met by the proposed transfer; and if the reciprocity target will not be met, then changing one or more of the respective maximum caps and/or the respective minimum caps to change the at least one second withdrawal/transfer amount to the interest-bearing aggregated deposit account held in the at least one recipient depository institution that was selected.

In a further embodiment, the obtaining a net transfer amount step further comprises calculating, using the one or more computers, a net of one or more deposit/transfer amounts, and one or more withdrawal/transfer amounts to obtain the net transfer amount for at least one source institution.

In a further embodiment, the further step may be performed of communicating the second transfer data, to have the second withdrawal/transfer amount withdrawn/transferred from the interest-bearing aggregated deposit account held by at least one recipient depository institution that was selected to the aggregated transaction account held by the at least one recipient depository institution that was selected, for delivery by a messenger to the respective recipient depository institution that was selected.

In a further embodiment, a step may be performed of aggregating respective first withdrawal/transfer amounts from respective overdraft facilities of respective aggregated transaction accounts held in multiple of respective recipient depository institutions to obtain an aggregated amount, for subsequent transfer.

In a further embodiment, the first withdrawal/transfer amount and the second withdrawal/transfer amount are substantially equal for the at least one recipient depository institution that was selected.

In a further embodiment, the government backed-insured interest-bearing aggregated deposit account is insured by the Federal Deposit Insurance Corporation.

In a further embodiment, the second transfer data reflecting withdrawal/transfer by the at least one recipient depository institution that was selected of the second withdrawal/transfer amount comprises instructions for presentation to the at least one recipient depository institution using one or more of methods that count against the 6 withdrawal limit imposed by Federal regulations no more than 6 times in a month, and comprising presenting instructions using one or more of the methods of: in person, or by mail, or by messenger, or by telephone and distributed by mail, or by automated teller machine, or a combination thereof for other withdrawals/transfers during the month.

In a further embodiment, an operation may be performed of sending, using the one or more computers, instructions to the at least one recipient depository institution that was selected to make a substantially immediate wire transfer of the first withdrawal/transfer amount using the overdraft facility from its aggregated transaction account.

In a further embodiment, operations may be performed of transmitting by wire instructions to a delivery service for delivery by messenger of the second transfer data reflecting the second withdrawal/transfer amount by the at least one recipient depository institution of the second withdrawal/transfer amount from the one or more interest-bearing aggregated deposit accounts held in the respective at least one recipient depository institution to the aggregated transaction account in the respective at least one recipient depository institution.

In a further embodiment, the client transaction information comprises one or more deposit/transfer amounts and/or withdrawal/transfer amounts or nets thereof of one or more client accounts.

In a further embodiment, the client transaction information comprises at least funds from a source financial institution that is a recipient depository institution.

In a further embodiment, operations may be performed of processing, using the one or more computers, client account transaction data comprising transaction data for one or more deposits/transfers for one or more client accounts and/or transaction data for one or more withdrawals/transfers from one or more of said client accounts, with the transaction data comprising a respective amount for each respective deposit/transfer and each respective withdrawal/transfer and/or a net of one or more of such amounts over a period of time, and wherein the obtaining a net transfer amount step further comprises calculating, using the one or more computers, a net of the one or more deposit/transfer amounts, and/or the one or more withdrawal/transfer amounts from multiple of the client accounts to obtain the net transfer amount.

In a further embodiment, each a plurality of the interest-bearing aggregated deposit accounts has an associated aggregated transaction account with an overdraft facility.

In a further embodiment, one of the one or more selection rules comprises selecting from among prospective recipient depository institutions the at least one recipient depository institution with the respective interest-bearing aggregated deposit account and the at least one respective aggregated transaction account with the overdraft facility, only if the prospective recipient depository institution has a recorded security interest in deposits of the one or more respective interest-bearing aggregated deposit accounts held therein.

In a further embodiment, an operation may be performed of generating one or more instructions to debit/transfer funds to one or more payment entities.

In a further embodiment, an operation may be performed of determining if an overdraft remains in the aggregated transaction account of the at least one recipient depository institution at a time subsequent to a transfer of one of the second withdrawal/transfer amounts from the one or more aggregated transaction accounts held therein.

In a further embodiment, one of the one or more selection rules comprises selecting only a recipient depository institution with an interest-bearing aggregated deposit account that has an associated aggregated transaction account that has an overdraft balance of less than a threshold amount.

In a further embodiment, an operation may be performed of maintaining data in the one or more databases on a respective positive or negative balance held in one or more of the respective aggregated transaction accounts with respective overdraft facilities of recipient depository institutions in the program.

In a further embodiment, the second transfer data reflecting withdrawal/transfer by the at least one of the one or more recipient depository institutions of the second withdrawal/transfer amount is communicated to a broker-dealer.

In a further embodiment, the first transfer data reflecting a wire or other electronic transfer of the one or more first withdrawal/transfer amounts using the overdraft facility of the at least one aggregated transaction account of the at least one recipient depository institution, reflects a transfer to one or more clearance accounts in one or more clearance institutions.

In a further embodiment, an operation may be perforated of making direct telephone or electronic communication with one of the one or more clearance institutions to provide instructions to withdraw/transfer funds from the clearance account therein to one or more of the source institutions and/or to one or more of the program recipient depository institutions and/or to one or more payment entities.

In a further embodiment, at least some of the funds for the second withdrawal/transfer for the partial or full settlement of the overdraft are withdrawn/transferred from one or more money funds.

In a further embodiment, at least some of the funds for the second withdrawal/transfer for the partial or full settlement of the overdraft are withdrawn/transferred from one or more aggregated investment vehicles that are not insured.

In a further embodiment, one of the one or more selection rules comprises making a selection at least in part based on directing a respective net transfer amount for a respective one of the source institutions to a one of the recipient depository institutions that is affiliated with the respective source institution.

In a further embodiment, a system is disclosed, comprising: one or more computers comprising memory wherein the memory stores computer-readable instructions comprising program code that, when executed, cause the one or more computers to perform the steps: accessing, using the one or more computers, one or more electronic databases, stored on one or more computer-readable media, comprising: (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, with one or more of the recipient depository institutions with an interest-bearing aggregated deposit account having at least one associated aggregated transaction account having an overdraft facility; (ii) client account information for each of a plurality of the respective client accounts comprising at least a respective balance of funds from the respective client account held in each of one or more recipient depository institutions in the interest-bearing aggregated deposit accounts holding funds of the respective client account; obtaining client account transaction information for each of multiple of the client accounts, the client account transaction information comprising credit information and/or debit information applied to or against a respective client account for one or more sub periods of time; obtaining, using the one or more computers, a respective net transfer amount for the one or more sub-periods of time for each of one or more of the respective source institutions; selecting at least one aggregated deposit account in one or more of the depository institutions to which to deposit/transfer or to withdraw/transfer funds to or from their respective one or more aggregated deposit accounts, and comprising an electronic capability, for at least one or more of the sub periods of time where one or more of the net transfer amounts require a first withdrawal/transfer amount, selecting at least one of the recipient depository institutions that has at least one aggregated transaction account with an overdraft facility based at least in part on one or more selection rules; generating first transfer data reflecting a wire or other electronic transfer that uses the overdraft facility of the at least one aggregated transaction account of the at least one recipient depository institution that was selected for the first withdrawal/transfer amount, with the withdrawal/transfer of the first withdrawal/transfer amount using the respective overdraft facility to occur prior to a partial or whole settlement of that respective overdraft from the one or more respective interest-bearing aggregated deposit accounts of the at least one recipient depository institution that was selected; generating second transfer data reflecting withdrawal/transfer by the at least one recipient depository institution of at least one second withdrawal/transfer amount from the one or more interest-bearing aggregated deposit accounts in the at least one depository institution that was selected to the respective at least one aggregated transaction account in the at least recipient depository institution that was selected in partial of full settlement of the overdraft; allocating, using the one or more computers, amounts of funds from multiple of the client accounts among multiple of the recipient depository institutions, so that the respective balance of funds for the one or more sub periods of time in each of the aggregated deposit accounts of the depository institutions, after taking into consideration the fund transfer amounts for the one or more sub periods of time, will substantially match a sum of the respective balances of funds from the multiple of the respective client accounts allocated to this respective aggregated deposit account; and updating, using the one or more computers, one or more of the electronic databases to update the respective balances of client account funds held in one or more of the recipient depository institutions in one or more aggregated deposit accounts therein.

The above and related objects, features and advantages of the present invention, will be more fully understood by reference to the following detailed description of the preferred, albeit illustrative, embodiments, of the present invention, when taken in conjunction with the accompanying figures, wherein:

BRIEF DESCRIPTION OF THE DRAWINGS

FIG. 2 is an exemplary representation of a time sequence for an exemplary method in accordance with one or more embodiments of the invention.

DETAILED DESCRIPTION

Figure 1A:
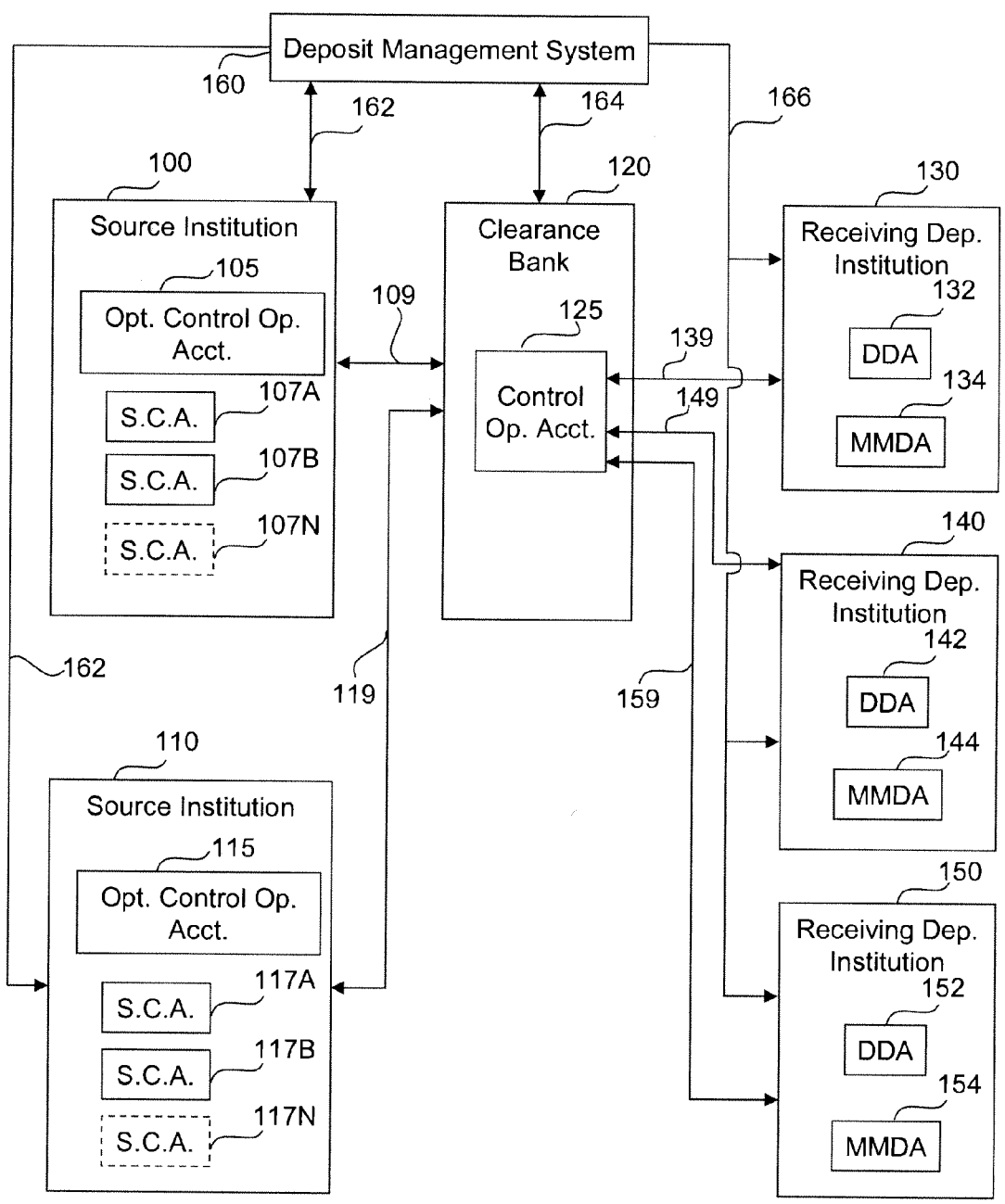
FIG. 1A is a schematic block diagram of an exemplary system in accordance with one or more embodiments of the invention.

The present invention discloses a deposit management system 160, a method, and a program product for implementing a deposit sweep program for accommodating banks and other types of financial entities with early cutoff times for fund movements and/or with varying processing and/or staffing schedules, while permitting fund movements for one or more programs using an overdraft facility, and/or using a method that generates data for transfers by forming depository institutions into groups based at least in part on cutoff times. In this system, a deposit sweep program includes source institutions, recipient depository institutions, and intermediaries, among others.

Source institutions may, by way of example, be banks, credit unions, registered investment advisors, broker dealers, asset managers, and other types of financial institutions, to name a few. Typically, the source institutions are the institutions that interact with the clients that are placing or authorizing the respective clients' funds to go into and/or be managed by the system. Note that a source institution can include one or more clearing institutions for other source institutions, investment advisors, and/or intermediaries for other source institutions. These terms will be discussed below.

Recipient depository institutions are typically banks or other types of deposit institutions whose accounts are backed by some form of insurance, such as government-backed insurance, like Federal Deposit Insurance Corporation (FDIC) insurance in the case of banks, or the National Credit Union Share Insurance Fund (NCUSIF) in the case of credit unions. However, note that some recipient depository institutions may hold financial instruments that are not insured.

One or more intermediary institutions may be used to facilitate the movement of funds between the source institution(s) and the recipient depository institution(s), and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that one or multiple entities may also fulfill a single function or role and/or multiple functions or roles.

With respect to some types of source institutions, the source institution itself may clear its own client accounts or it may use another entity to clear its client accounts. If a source institution is a clearing entity, it may provide clearing services to other source institutions, such as broker-dealers, banks, financial advisors, to name a few. Such entities for which clearing services are performed by another entity are sometimes referred to as "correspondents." Under some guidelines, when a clearing entity is used to clear funds for one or more correspondents, the funds of the clearing entity and the one or more correspondents may be held together in an aggregated account such as an interest-bearing aggregated money market deposit account or an aggregated demand deposit account. In one or more embodiments, the funds from each different correspondent may be segregated in a separate aggregated account.

In some deposit sweep systems, one entity may play the role of one or more of the above. For example, a source institution, such as a bank, may also be a recipient depository institution. Similarly, a source institution, like a broker-dealer, or a bank, may be affiliated with one or more of the recipient depository institutions. In one or more embodiments, there may be no affiliation between the institutions, or an affiliation between only some of the institutions.

Further, the administrator may also be either a source institution, a recipient depository institution, a clearance bank, or another entity participating in deposit sweep functions. Further, in one or more embodiments one entity may play part of one role and another part of another role. For example, when a bank is an intermediary it may be used to facilitate the transfer of funds, but also may be a source and/or recipient institution. Such a bank, may or may not use a separate record keeper.

Likewise, a particular program may have one source institution or multiple source institutions. Similarly, a particular program may have one recipient depository institution or multiple recipient depository institutions.

A "program" comprises a deposit arrangement to make available government-backed insurance through one or more aggregated accounts, wherein such program can provide government-backed insurance in an amount greater than an insurance limit for funds held in a single depository institution, through the use of a plurality of aggregated deposit accounts, with the aggregated deposit accounts in different program depository institutions. Each program may include one or more insured deposit products, with one or more of the programs having different attributes, such as different insurance levels, different tier options and rates paid, and services. In one embodiment, the rates paid may be determined by such factors as the balance in the client's insured account, or can be determined by the total value of the client's brokerage account, or can be determined by the total value of a group of accounts for a particular household together, or can be determined by relationship pricing based on the number of products a client uses though a source institution (SI) or affiliated source institutions, to name a few. Each source institution may have a plurality of client accounts, S.C.A.'s, that invest in particular products that make up part of a particular program. The client accounts, S.C.A., may be for individuals or corporations or government entities, or any other form of entity. Thus, for example, a source institution may manage a number of programs PROGRAM SI1-1, PROGRAM SI1-2, . . . PROGRAM SI1-$p$, where each client account, S.C.A., of the source institution SI1 invests in at least one of the products under at least one of the programs PROGRAM SI1-1-PROGRAM SI1-$p$. Examples of different kinds of programs that may be offered, include a program with cash management services, a program for high net worth individuals with a higher minimum balance required, a program paying a lower rate and offering more services, a no frills program with a higher rate and no services where for a fee, the client could get other services, to name a few. Note that in one or more embodiments, a program may also manage some client funds that are held in investment instruments that are not government-backed insured instruments.

Each source institution may have one or more programs of its own, and/or may participate in one or more programs of other institutions. A client may also have one or more of its own programs operating out of one or more source institutions. Each client may participate in one or more programs from a single source institution, or may participate in programs in several different institutions, and/or may participate in one or more of the client's own programs.

The present invention may be used in the context of these exemplary or other fund movement systems.

In the description to follow, the term "client account" refers to an account associated with client funds, such as, for example, consisting of funds of the client designated or determined for management by the deposit management system, to be described.

Referring to FIG. 1A, the present invention generally relates to a system, method and/or program product for administering a deposit sweep program wherein funds are received/swept from or deposited back to one or more source institutions 100, 110, e.g., financial institutions, such as banks, broker-dealers, financial advisors, intermediaries and/or other financial institutions, under instruction of a deposit management system 160 ("DMS"), to or from government-insured interest-bearing aggregated deposit accounts in one or more recipient depository institutions, e.g., banks 130-150 participating in the deposit sweep interchange program. In one or more embodiments, a portion of the client account funds may also be deposited in other investment vehicles held in or directed by another respective recipient depository institution. Note that in one or more embodiments, a respective source institution may hold one or more of these aggregated accounts and may also function as a recipient depository institution.

The deposit management system 160, comprises one or more computers, which can be configured to perform one or more of the following tasks:

(a) obtaining information regarding transactions applied to client accounts at source institutions 100, 110 in a particular time period, such as over a particular time period, such as a range of hours, day, week, month or the like. Such information may be in the form of detailed individual transactions, summary transactions or combinations thereof. Transactions could include sweeps, checks, transfers to cover, e.g., securities transactions or margin accounts, debit card transactions, credit card transactions, on-line bill paying transactions, touch tone bill paying data, ACH transactions, wire transactions, to name a few. In one or more embodiments, such information may be obtained directly by processing one or more transactions, or indirectly by other means.

In embodiments, such information may be received electronically in the form of a sweep file which can contain either detailed or summary information for each client account which has activity in a given time period. In embodiments, such information may be received in person, over the telephone, by fax or other distribution means, and entered by keying or scanning such information. One or more items of information may be obtained by one or more of these exemplary methods.

(b) obtaining net transfer information associated with the movement of funds from and/or to source institutions, clearance institutions and/or recipient institutions. Such net transfer information may be received electronically either in connection with a sweep file and/or separately, received in person, over the telephone, by fax or other distribution means and entered by keying or scanning such information, and/or by calculating or by verifying the net transfer information by the deposit management system 160. The net transfer information can reflect one net transfer per institution, and/or multiple net transfers reflecting each separate transfer to be conducted between institutions. For example, a net transfer could reflect a single net transfer between a source institution and a clearance institution to reflect transactions occurring during a particular time period, such as a range of hours, day, week, month or the like. A net transfer could also or alternatively reflect a plurality of net transfers between a clearance institution and different recipient institutions associated with a particular transfer of funds relating to transactions occurring during one or more particular time periods.

(c) obtaining allocation information associated with the allocation of funds among various recipient institutions. The allocation information may be received electronically either in connection with a sweep file and/or separately, received in person, over the telephone, by fax or other distribution means and entered by keying or scanning such information, and/or may be calculated and/or may be verified by the deposit management system 160. The allocation information may be calculated based at least in part on one or more criteria. Examples of such criteria are set forth in U.S. Pat. No. 7,752,107, and U.S. application Ser. No. 12/638,544, filed on Dec. 15, 2009, which are hereby incorporated by reference in their entirety. The allocation information may be used in generating the net transfer information to and/or from recipient depository institutions.

(d) generating recommended and/or actual withdrawal/transfer amount(s) and/or instructions and/or deposit/transfer amount(s) and/or instructions to and/or from source institutions and/or recipient institutions. In embodiments, the system may generate recommended and/or actual instructions to be carried out by source institutions, agents of source institutions, intermediaries and/or others. In embodiments, intermediaries may up load or otherwise provide instructions to be approved, executed and/or performed by others.

(e) obtaining allocation information regarding funds held in particular aggregated deposit accounts at recipient depository institutions associated with particular client accounts. In one or more embodiments, the allocation information may be calculated based at least in part on one or more criteria. In embodiments, the record keeper performs such allocations in accordance with one or more parameters.

As noted, each of a plurality of these recipient depository institutions 130-150n in the deposit sweep management system 160 holds one or more interest-bearing aggregated deposit accounts 134, 144 and 154 (for example, an aggregated money market deposit account, e.g., MMDA, for holding funds associated with a plurality of clients accounts in the program. In embodiments, these aggregated deposit accounts can be insured, for example with government-backed insurance, such as Federal Deposit Insurance Corporation (FDIC) insurance in the case of, e.g., a bank, or National Credit Union Share Insurance Fund (NCUSIF) insurance in the case of, e.g., a credit union, to name a few. Note that in one or more embodiments, some of the funds managed by the program may be held in other investment vehicles, such one or more money funds, or one or more aggregated investment vehicles that are not insured.

In embodiments using an overdraft facility, one or more, of the recipient depository institutions with the interest-bearing aggregated deposit accounts 134, 144, 154, may also hold a transaction account 132, 142, 152, with an overdraft facility, such as a demand deposit account (DDA) or a NOW account, for facilitating withdrawals from the interest-bearing aggregated deposit account 134, 144, 154, in the respective recipient depository institution. This transaction account with the overdraft facility may be used to extend the time of day in which the source institutions and/or the recipient depository institutions and/or intermediary institutions may place into and/or withdraw from and/or reallocate funds in a program, as well as to accommodate institutions with relatively earlier wire deadlines/cutoff.

In an exemplary embodiment shown in FIG. 1A, information for a plurality of client accounts (107A, 107B, . . . 107N) associated with a source institution 100 is held in one or more databases, with each of a plurality of the respective client accounts held on behalf of different clients and comprising client funds managed by a program. In one or more embodiments, the deposit management system 160 may maintain electronic records corresponding to client accounts (107A, 107B, . . . 107N) in the one or more databases. In one or more embodiments, the respective source institution 100 has a control operating account. In one or more embodiments, the control operating account 105 may be at the respective source institution 100. Alternatively or in addition, in one or more embodiments, the control operating account for the source institution 100 may be at another financial institution, such as a clearance account 125 held in a clearance bank 120. In one or more embodiments, funds flow in and out of the client accounts (107A, 107B, . . . 107N), via the control operating account 105 and/or via control operating account 125. Alternatively, in one or more embodiments, the funds in one or more of the client accounts may flow directly between institutions without an internal and/or an external control operating account. In one or more embodiments, fund flows may be via a combination of one or more control operating accounts and directly between institutions without using an external control operating account.

Fund movement data may be received by the deposit management system 160, via a sweep file comprising fund transfer data swept from or to one or more of client accounts of a source institution 100, or via fund transfer data from another entity (e.g., a payment or credit vendor such as a debit card or credit card processor), or from a client, or from a fund reallocation determined by or for the deposit management system 160, or from any other source. The fund movement data may be received electronically by wire, or via Facsimile or telephone, for example, so that the data may need to be manually keyed, optically scanned, or otherwise entered into the deposit management system 160, and/or it may be verified and/or in some cases, calculated. The fund transfers may comprise data for individual check deposit data, wire deposit data, electronic ACH deposit data, electronic debit card transaction files, electronic credit card transaction files, check presentment data, ACH debit data, touch tone bill paying data, Internet bill paying data, a sweep file, and/or a net of a plurality of deposit/transfers for one client account or multiple client accounts, and/or a net of one or more of withdrawals/transfers for one client account or multiple client accounts, and/or a net of one or more deposits/transfers and one or more debits/transfers from one client account or multiple client accounts, to name a few.

Figure 1B:
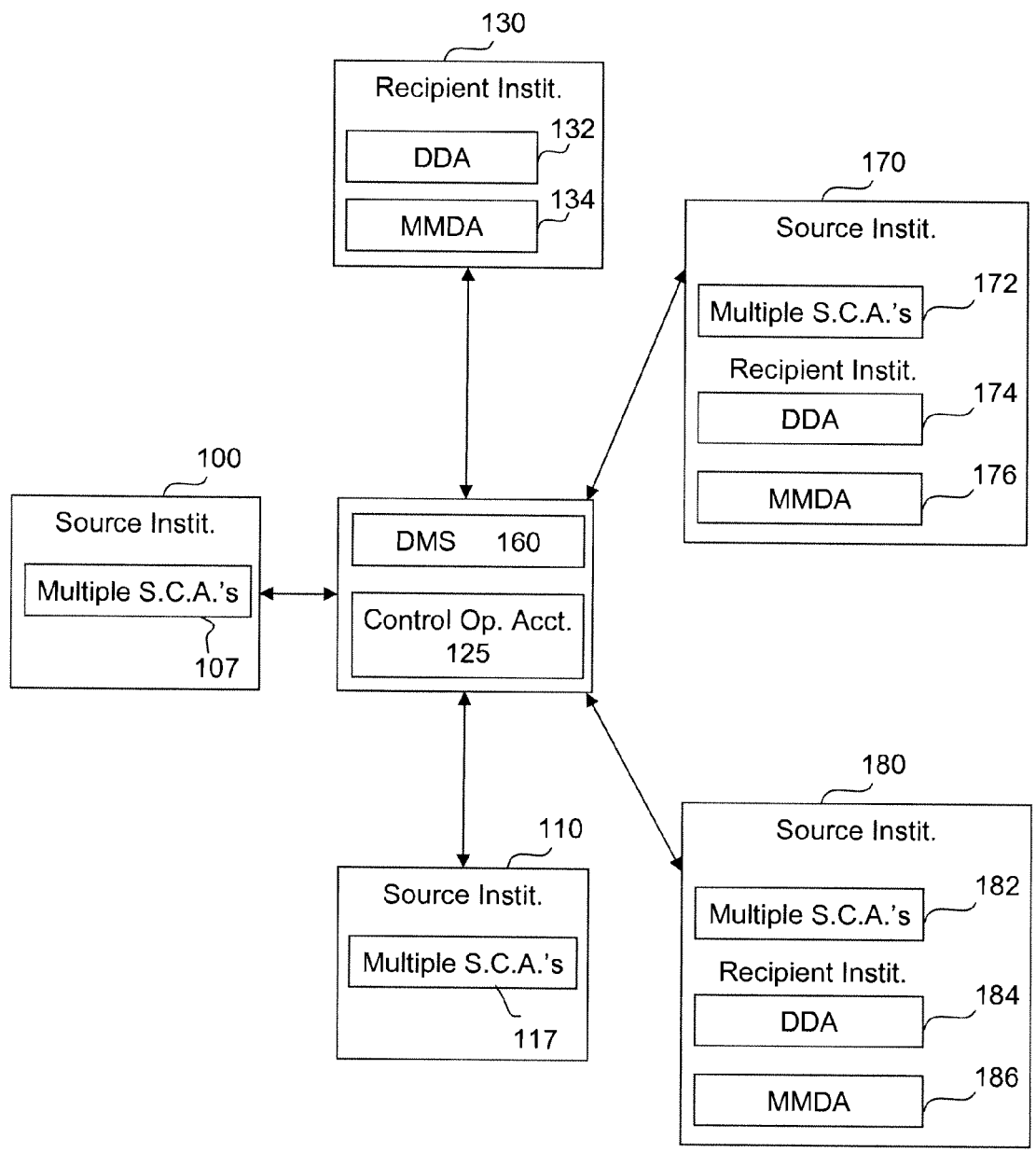
FIG. 1B is a schematic block diagram of another exemplary system in accordance with one or more embodiments of the invention.

FIG. 1B illustrates another exemplary embodiment of the overall system in a hub and spoke context, for ease of explanation. At the center or hub is the deposit management system 160, and a control operating account 125. The deposit management system 160 and control operating account 125 could be at the same or different institutions, consistent with the present invention. The source institutions 100 and 110 are illustrated as spokes, with each source institution comprising client accounts, as reflected in FIG. 1A. One or more of the source institutions may optionally also include a control operating account associated therewith in one or more embodiments. The control operating account associated with the respective source institution may be at the respective source institution, or at another institution affiliated with the source institution, or at a different institution entirely. A source institution may also be the same as or affiliated with one or more institutions associated with the deposit management system 160, the control operating account 125, or the recordkeeper for the system. The recipient depository institution 130, with its transaction account 132, and MMDA 134, is shown as another spoke in the figure. Institutions 170 and 180 are illustrated as yet other spokes in the figure. Institutions 170 and 180 operate as both source institutions in some fund transfers, and recipient depository institutions in other fund transfers. Institution 170 comprises multiple client accounts 172, as well as an aggregated transaction account 174 and an MMDA 176. Likewise, institution 180 comprises multiple client accounts 182, as well as an aggregated transaction account 184 and an MMDA 186. The deposit management system 160 may keep electronic records associated with the multiple client accounts 172, 182, and the like.

Other forms of deposit sweep systems may also be used with the present invention.

FIG. 2 comprises an illustrative timeline of operations for one embodiment of the invention using an overdraft facility. However, note that the operation timing in one or more embodiments may vary, and the order of the steps and timing may vary, and additional steps may be added, or omitted, as desired.

At a time T1 in the timeline of FIG. 2, source institution fund transfer data is generated. Note that how and where this data is generated is not limiting on the invention. For example, the fund transfer data may be generated by respective source institutions, and/or by the deposit management system 160 as part of a reallocation of funds among recipient depository institutions. See the discussion of the fund transfer data obtained by the deposit management system 160, above.

Fund transfer data, such as a sweep report, or payment entity report, or fund reallocation data, or client communications, may be received electronically either in connection with a sweep file and/or separately, received in person, over the telephone, by fax or other distribution means and entered by keying or scanning such information, and/or calculated or verified by the deposit management system 160. For example, the fund transfer data may represent information about respective client funds to be transferred out of the deposit management system or to be transferred to recipient depository institutions in the deposit management system. In one or more embodiments, this information may comprise a net for each client account, of client transactions crediting/transferring funds to, and/or debiting/transferring funds from, the respective client account, determined over a period of time. In another embodiment, the transfer data may comprise a net of a plurality of fund transactions for a plurality of client accounts of a source institution. T2 in the timeline of FIG. 2 represents receipt by the deposit management system 160 of fund transfer data for a source institution, whether transferred electronically, or keyed manually into the system, and/or verified, and/or calculated by the deposit management system 160.

The one or more computers of the deposit management system 160 (DMS) may verify the transfer amount. This verification is represented by time T3 in the timeline of FIG. 2.

In embodiments, the one or more computers of the deposit management system 160 can be configured with programming code to select one or more of the recipient depository institutions, e.g., banks 130-150n, in the deposit management system 160, for deposits/transfers and/or withdrawal/transfers, based at least in part on the fund transfer data and on one or more parameters. In one or more embodiments, the one or more recipient depository institutions for the transfer are preselected, or deselected, by the source institution, or by the one or more recipient depository institutions or by the clients or by the deposit management system 160. In one or more embodiments, a selection of recipient depository institutions may be performed using real-time processing, by computers of the deposit management system 160 or another entity, based at least in part on one or more parameters. In another embodiment, a selection of recipient depository institutions may not be performed using real-time processing. The respective one or more fund transfer amounts can then be allocated to one or among a plurality of the identified or selected or provided recipient depository institutions.

In one or more embodiments, the allocation may be based, at least in part, on the fact that a given recipient depository institution has contributed source funds to the deposit management system (when operating as a source institution), or based, at least in part, on an amount of source funds contributed by the given prospective recipient depository institution (when operating as a source institution from its client accounts and/or other of its source institution funds), to interest-bearing aggregated deposit accounts or other accounts associated with the program. Note that such reciprocity may be one-to-one, or may be based at least in part on something other than one-to-one, and may be determined using an algorithm, or other means of determining the amount. In one or more embodiments, the algorithm may be implemented electronically. In one or more embodiments, it may be manually applied. Also, the reciprocity may only be applied for funds of a given set of client accounts, or a given type of client accounts, such as accounts with municipal or other governmental funds. Examples of such arrangements are taught, for example, in U.S. Pat. No. 7,536,350, and application Ser. No. 11/641,046, filed Dec. 19, 2006, which are hereby incorporated by reference in their entirety for all purposes.

Another parameter that may be used to select one or more recipient depository institutions and to determine and allocate deposit/transfer amounts and/or withdrawal/transfer amounts, may be an amount of funds of a given client account already held in the particular recipient depository institution in the management system relative to a deposit limit associated with available insurance protection, such as a government-backed insurance like FDIC insurance or NCUSIF insurance, to name a few, or some other deposit limit set either by the program, the program participants, or otherwise, or relative to one or more client or source institution or intermediary institution selected parameters relating to an amount or a percentage of funds from that client account that may be held by a given recipient depository institution in the management system. Examples of such parameters are discussed for example in U.S. Pat. No. 7,672,886 and U.S. Pat. No. 7,680,734, U.S. Pat. No. 7,752,107, U.S. Pat. No. 7,668,771, U.S. application Ser. No. 12/638,544, filed on Dec. 15, 2009, which are incorporated by reference in their entirety for all purposes. This operation is represented in the timeline of FIG. 2 by T4.

The deposit management system 160 can generate and/or send an electronic message or other communication to be received by the one or more recipient depository institutions with information about a prospective deposit/transfer or withdrawal/transfer, allocated to the respective recipient depository institution. This information may comprise the amount of the prospective deposit/transfer or withdrawal/transfer allocated to the respective recipient depository institution. In one or more embodiments, this message may be generated and transmitted in person, by messenger, over the telephone, or by electronic wire either directly or indirectly. This operation is represented as T5 in the timeline of FIG. 2.

At T6 in the timeline of FIG. 2, in the context of a withdrawal/transfer, the transfer data is generated and/or transmitted by the deposit management system 160 directly and/or in conjunction with other agents to provide instructions to promptly transfer funds from an aggregated transaction account with an overdraft facility (e.g., DDA and/or NOW account) in one or more of the recipient depository institutions by wire or other comparably fast method, directly to one or more source institutions, and/or alternatively, to an internal control operating account 105 or to a control operating account 125 in a clearance bank 120. These withdrawn/transferred funds may then be transferred to one or more accounts in one or more source institutions, or one or more accounts in one or more recipient depository institutions, or to one or more payment entities. Note that the transfer data for the transaction account with an overdraft facility may be sent directly by wire or other means to the recipient depository institution, or may be sent to the relevant source institution for subsequent communication to the respective recipient depository institution. The resulting wiring or other prompt transfer of funds from the aggregated transaction account 132 with the overdraft facility occurs before transfer to the aggregated transaction account 132 of an amount from the interest-bearing aggregated account 134 (e.g. an MMDA) or other account in the respective recipient depository institution actually holding the funds for the withdrawal amount. In embodiments, the aggregated transaction account 132 can maintain a zero balance or near zero balance, so that the funds for the withdrawal may be taken completely or substantially completely from the overdraft facility for the aggregated transaction account. In another embodiment, a balance may be maintained in the aggregated transaction account, so that some of the withdrawal amount is taken from this balance, and some of the amount for the withdrawal is taken from the overdraft facility. In another embodiment, the balance may fluctuate.

In embodiments, a reverse wire or draw-down message or instruction may be sent from the source entity, e.g., a source institution or intermediary institution, to directly execute the withdrawal/transfer from the overdraft facility of the respective aggregated transaction account.

At time T7 in the timeline, transfer data for the insured interest-bearing aggregated deposit account or other account holding funds may be generated by the deposit management system 160 to settle in whole or in part the overdraft balance of the aggregated transaction account. This transfer data is then communicated either directly or indirectly to the recipient institutions. In one or more embodiments, the transfer data may be for presentation in a manner that does not count against the six transfer limit per month imposed by Federal regulations on interest bearing accounts, e.g., either in person, or by mail, or by messenger, or by telephone and distributed by mail, or by automated teller machine, or a combination thereof, so that the insured and interest-bearing status of the aggregated deposit accounts may be preserved. This manner of making embodiment can be implemented by ensuring that no more than some predetermined number of withdrawals are made using a method that implicates the 6 withdrawal limit and that all other withdrawals from that account during the month are made in a manner that does not count against the six transfer limit per month. In one or more embodiments, the instructions may be generated electronically, and communicated in some convenient way to a messenger service, followed by a subsequent messenger delivery to the recipient depository institution. For example, the transfer data may be communicated electronically by wire, and/or be sent by Fax and/or by email and/or hand delivery and/or by a telephone call for confirmation, an in person presentation, and/or a messenger delivery of instructions for a fund transfer to the recipient depository institution to perform a book or other transfer of a respective allocated withdrawal amount of funds from the MMDA 134 or other aggregated deposit account actually holding the funds to be withdrawn in the respective recipient depository institution, to the aggregated transaction account 132 in the respective recipient depository institution, in order to settle all or most of the overdraft balance to bring the aggregated transaction account to zero or to another amount. Note that a communication of the instructions to the messenger service may occur at the same time as the electronic communication of instructions at T6 for the wire or other prompt transfer from the transaction account with the overdraft facility, or may occur before or afterward. Note that in one or more embodiments, the fund transfer data may be communicated by the deposit management system 160 to the respective source institution for provision to the messenger service.

At T8 in the timeline, client account amounts are reallocated/reshuffled among the recipient depository institutions to substantially match the one or more fund transfers, and one or more databases may be updated to reflect the one or more withdrawals/transfers from the one or more of the recipient depository institutions.

At T9, the overdraft from the transaction account may be settled. The settlement may be performed by the respective recipient depository institution, or another recordkeeping entity, or the deposit management system 160, to name a few.

Accordingly, a deposit management system 160 may be established in some embodiments with a system processing timeline for withdrawals/transfers that can be configured to meet requirements of deposit management system operations and may be amenable to the processing/business hours of as many other financial and recordkeeping institutions as possible with varying cutoff times and/or across various regions/time zones. In one or more embodiments, the selection of recipient depository institutions, the timing of communicating the transfer data, and the determination of withdrawal/transfer amounts from those selected recipient depository institutions may be based, at least in part, on a time of receipt of the fund transfer data, and/or on the respective fund transfer cutoff times for respective recipient depository institutions and/or source institutions or other entities involved in the fund transfer, and/or the type of funds involved (e.g. from municipal accounts), and/or the affiliation and/or clearing designations for the respective source institutions sending the data. In one or more embodiments, the selection of recipient depository institutions and the determination of withdrawal/transfer amounts from those selected recipient depository institutions may be based, at least in part, on reciprocity. Reciprocity, in this context, means that the deposit management system 160 takes into consideration the fact that the prospective recipient depository institution has sent deposits (when operating as a source institution) into the program, and/or takes into account the amount of source fund deposits that the prospective recipient depository institution (when operating as a source institution) has sent to the program, to determine the fact and/or amount of the withdrawal that will be transferred out. This reciprocity consideration may be based at least in part on some or all of the funds held in other recipient depository institutions that originated from client accounts of the respective recipient depository institution (when functioning as a source institution). Alternatively, the reciprocity may be based at least in part on funds of only some client accounts of the recipient depository institution, such as municipal, state, federal or other governmental entity client accounts, or accounts of local businesses, in the recipient depository institution, sourced to the program.

The present invention may be useful for facilitating withdrawal/transfer and/or deposit/transfer of fund amounts to and from the program, for purposes such as servicing client account withdrawals/transfers and/or deposit/transfers, and/or for fund reallocation determined by the deposit management system or another entity. It may be advantageous where the withdrawal/transfer or deposit/transfer data may be received close to a cutoff time for the respective recipient depository institution, or source institution, or other entity that may be involved in the fund transfer, such as an entity in the recordkeeping or fund transfer chain, that may be subject to an early cutoff. Thus, in one or more embodiments, the invention may be useful in extending the program's transaction and settlement time (trade time) with the source institutions and other entities.

Accordingly, an advantage of some embodiments of the deposit management system of the invention may be a successful and timely movements of funds exchanged between institutions. Such timely movement of funds may facilitate local processing schedules and staffing schedules, that might be caused by different time zones, and/or for other reasons. Such timely movement of funds may facilitate receipt of instructions at a time before local cut-off times for wires (both outgoing and incoming), or at a time before cutoff for settlement with the Federal Reserve or correspondent bank for deposits and withdrawals and other transfers, or in some cases, before a time in which the institution can invest the funds. Such timely movement of funds may facilitate insuring deposits at intended recipient or source institutions. Such timely movement of funds may, in one or more embodiments, facilitate settlement functions with one or more of the source financial institutions or recipient depository institutions or other entities involved in the fund transfer operation or recordkeeping. Such timely movement of funds may facilitate customer withdrawals, deposits, and reallocation of funds, in the program, and may facilitate limiting a use of 'automatic' withdrawals (withdrawals that would count against the 6 withdrawal limit per month imposed by Federal Banking Regulations) from the interest-bearing aggregated deposit accounts in recipient depository institutions.

In one or more embodiments, the system may establish or have established or require establishment of an interest-bearing government-backed (e.g., FDIC, NCUSIF, etc.) insured aggregated deposit account, such as an aggregated money market deposit account (MMDA) at one or more depository institutions. The system may establish or have established or require establishment of a like-titled (titled to the same entity as the interest-bearing aggregated deposit account) aggregated transaction account, such as a DDA, or NOW account, at each of one or more of the recipient depository institutions, with the aggregated transaction account having an overdraft facility. In one or more embodiments, the transaction account will not be funded, i.e., a zero balance account. In one or more embodiments, the transaction account may have a balance.

Accordingly, in one or more embodiments, the time for when the source institutions and/or the recipient depository institutions place funds into or withdraw funds from the deposit management system may be extended, e.g., the cutoff time for various institutions may be effectively pushed back through the respective recipient depository institution wiring or other prompt transfer of the funds from its aggregated transaction account, in part or in whole from its overdraft facility, promptly upon receipt of the instructions, and in one or more embodiments, immediately upon receipt of the emailed or other electronic transmission of instructions, without having the need to wait for a messenger/courier delivery of transfer instructions to the recipient depository institution to perform and the subsequent performance of the book or other transfer of funds from the interest-bearing aggregated deposit account in the recipient depository institution actually holding the funds. As noted, the wire amount from the respective recipient depository institution's program aggregated transaction account will be drawn in part or in whole against the aggregated transaction account overdraft facility, which may, in one or more embodiments be secured.

When the transfer instructions for the interest-bearing aggregated deposit account are delivered by the courier/messenger, the recipient depository institution will withdraw funds from the respective account (in one or more embodiments, an aggregated MMDA) and deposit those funds into the respective recipient depository institution's aggregated transaction account (e.g., via a book or other transfer) to thereby cover in whole or in part the overdraft. In the event that the messenger does not timely deliver the MMDA withdrawal instructions, the respective recipient depository institution may use one of the 6 electronic withdrawals during the month (or other prescribed period), as permitted in the Banking Regulations. In one or more embodiments, during a statement period, if there are 6 or less days in the statement cycle, a messenger may be unnecessary for any remaining withdrawals during that cycle, as taught by application Ser. No. 12/974,973, filed on Dec. 21, 2010, which is hereby incorporated by reference in its entirety for all purposes.

Figure 3:
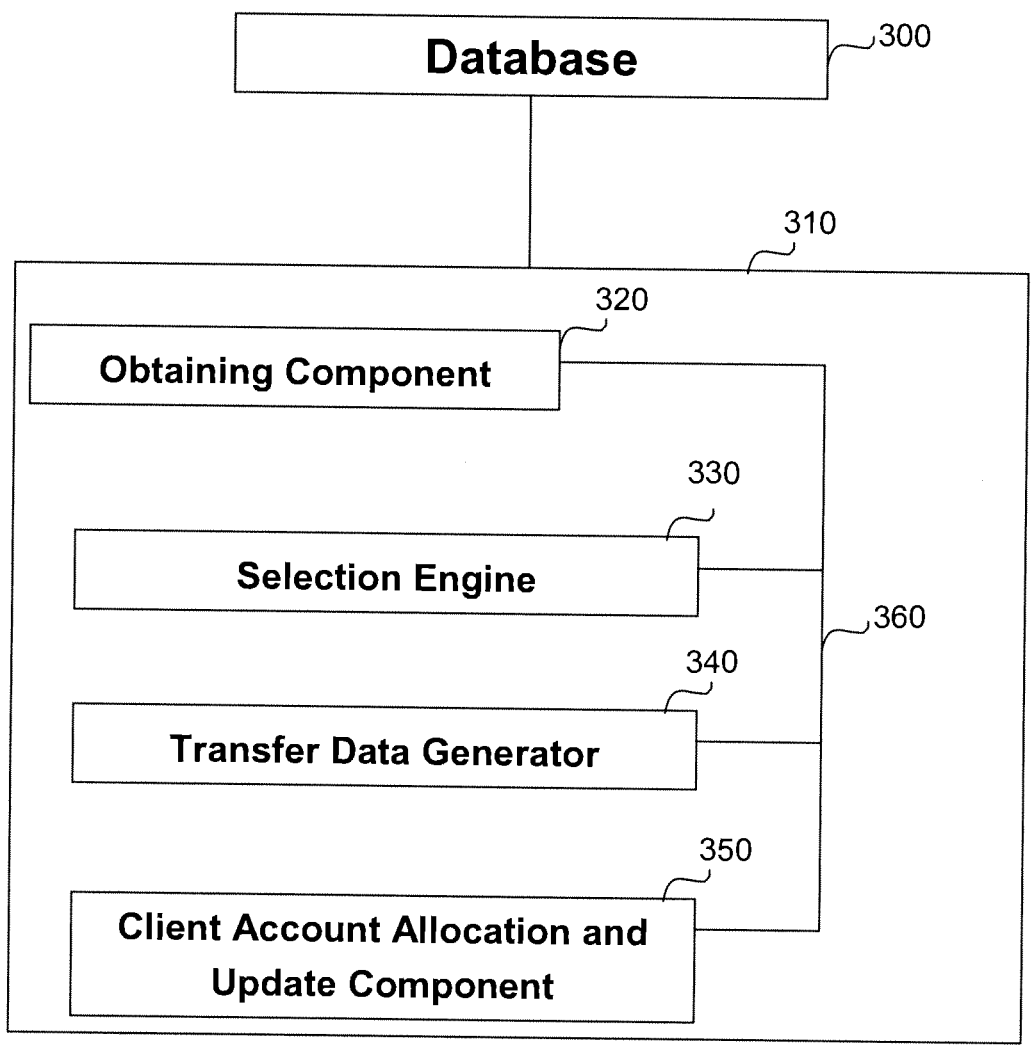
FIG. 3 is a schematic block diagram of an exemplary system in accordance with one or more embodiments of the invention.

One non-limiting overdraft embodiment of a deposit management system for implementing the invention is shown in FIG. 3 and comprises one or more electronic databases 300 and one or more computers 310.

In one or more embodiments, the one or more electronic databases 300, stored on one or more computer-readable media, comprises: aggregated account information for a plurality of government-backed insured and interest-bearing aggregated deposit accounts held in a plurality of recipient depository institutions participating in a program, and client account information.

The aggregated account information may comprise, in one or more embodiments, information on a balance of funds in the respective aggregated deposit account, and/or identification information for the respective depository institution holding the aggregated deposit account, and/or source institution information (as described below) for the funds held by the aggregated deposit account, to name a few. Each of multiple of the depository institutions in the deposit management system holds at least one of the government-backed insured interest-bearing aggregated deposit accounts, wherein funds from a plurality of client accounts are aggregated with funds of other client accounts in the aggregated deposit accounts. In one or more embodiments, one or more of the banks or other depository institutions in the program with an government-backed insured interest-bearing interest-bearing aggregated deposit account may have at least one associated aggregated transaction account having an overdraft facility.

As noted, in one or more embodiments, the aggregated account information for each of a plurality of the recipient depository institutions that are source institutions, may further comprise a balance of source funds from the respective recipient depository institution, where the source funds of a respective one of the recipient depository institutions comprises funds where the respective recipient depository institution may be a source of the funds into the deposit management program. In one or more embodiments, the source funds comprise funds of the institution held in one or more of the aggregated deposit accounts in the other recipient depository institutions in the program, and/or may be held in other investment vehicle accounts managed by the deposit management system 160.

In one or more embodiments, the client account information in the one or more databases may comprise, for each of a plurality of the respective client accounts, one or more or all of: (a) a respective balance in the respective client account; (b) deposit/transfer and/or withdrawal/transfer data for the respective client account, which may include individual credit and debit data and/or nets of such credit and debit data for the client account, as previously described; and (c) a respective balance of funds from the respective client account held in each of one or more banks or other recipient depository institutions in the interest-bearing aggregated deposit accounts holding funds of the respective client account. In one or more embodiments, the client account represents funds of a client held in one or more of the interest-bearing aggregated deposit accounts held by the depository institutions in the program and any other investment vehicle accounts managed by the program.

In one or more embodiments, the one or more electronic databases may further comprise transaction account identifiers for the one of more aggregated transaction accounts with overdraft facilities held in the respective recipient depository institutions in the program, that are used to obtain prompt or immediate withdrawals/transfers from the respective recipient depository institutions.

The one or more computers 310 for the deposit management system, in one or more embodiments, may be operatively connected/accessible to computer-readable program code stored in memory, and may be capable of executing program code uploaded therefrom to configure the one or more computers into one or more special-purpose machines. The code, in one or more embodiments, may be comprised of programming modules or other software forms that implement functional components in the one or more computers. These modules or other software forms may be stored separately or in combination.

The one or more computers 310 may be configured, in one or more embodiments, with program code to form an obtaining component 320, for obtaining client account transaction information for each of multiple of the client accounts, the client account transaction information comprising credit information and/or debit information applied to or against a respective client account for one or more sub periods of time and/or other transfer information, and obtaining a respective net transfer amount for the one or more sub-periods of time for each of one or more of the respective source institutions.

The client account transaction information for each of multiple of the client accounts may comprise information regarding transactions applied to client accounts at source institutions 100, 110, such as over a particular time period, such as a range of hours, days, weeks, month or the like. Such information may be in the form of detailed individual transactions, summary transactions or combinations thereof. Transactions could include sweeps, checks, transfers to cover, e.g., securities transactions or margin accounts, debit card transactions, credit card transactions, on-line bill paying transactions, touch tone bill paying data, ACH transactions, wire transactions, to name a few. In one or more embodiments, such information may be obtained directly by processing one or more transactions, or indirectly by other means. In one or more embodiments, such information may be received electronically in the form of a sweep file which can contained either detailed or summary information for each client account which has activity in the given time period. In one or more embodiments, such information may be received in person, over the telephone, by fax or other distribution means, and entered by keying or scanning or other means of entry of such information. One or more items of information may be obtained by one or more of these exemplary methods. The other transfer information may comprise information generated by the deposit management system 160 or another entity as part of a fund reallocation, or may be generated by another entity, and may comprise depository institution opt-in or optouts, depository institution minimum caps and/or maximum caps, the addition or deletion of depository institutions based on various parameters, to name a few.

The respective net transfer amounts for the one or more sub-periods of time for each of one or more of the respective source institutions may comprise net transfer information associated with the movement of funds from and/or to source institutions, clearance institutions and/or recipient depository institutions. Such net transfer information may be received electronically either in connection with a sweep file and/or separately, and/or may be received in person, over the telephone, by fax or other distribution means and entered by keying or scanning or other means of entry of such information, and/or it may be calculated and/or may be verified by the deposit management system 160. The net transfer information can reflect one net transfer for a respective source institution, and/or multiple net transfers from a respective source institution.

The obtaining component 320, in one or more embodiments, may comprise a communication component, configured on one or more computers, for receiving electronically, via one or more electronic networks, the information on the respective one or more fund withdrawal/transfer amounts and/or one or more fund deposit/transfer amounts, to be transferred to or from one or more recipient depository institutions, to or from one or more source institutions or one or more other recipient depository institutions, and/or directly to credit card or other payment entities.

In one or more embodiments, the obtaining component 320, may be configured to perform a netting operation to calculate a respective net transfer amount for one or more sub-periods of time for one or more of the respective source institutions. Note that the net transfer amount may be received for other of the source institutions.

The one or more computers 310 for the deposit management system may be further configured with program code to comprise a selection engine 330 for selecting at least one aggregated deposit account in one or more of the depository institutions to which to deposit/transfer or to withdraw/transfer funds to or from their respective one or more aggregated deposit accounts, and comprising, for at least one or more of the sub periods of time where one or more of the net transfer amounts require a first withdrawal/transfer amount during a month period, selecting at least one of the recipient depository institutions that has at least one aggregated transaction account with an overdraft facility based at least in part on one or more selection rules.

In one or more of the embodiments, the selection by the selection engine 330 may be predetermined by the deposit management system 160 or predetermined by the source institution or predetermined by its clients, or by another third party, and/or may be based at least in part on a de-selection by the source institution or its clients, or the recipient depository institution or the deposit management system. In one or more embodiments, the selection engine 330 may select recipient depository institutions with an interest-bearing aggregated deposit account and at least one transaction account in substantially real time, based at least in part on one or more parameters. In one or more embodiments, the selection of recipient depository institutions may not be performed using real-time processing.

In one or more embodiments, the selection engine 330 may perform the selection based at least in part on the fact of, and/or an amount of funds that the prospective recipient depository institution, when operating as a source institution, has provided to the program to be held in aggregated deposit accounts of other recipient depository institutions in the program relative to amounts sourced to the program from other prospective recipient depository institutions, and/or relative to one or more threshold amounts. In one or more embodiments, an operation is performed of comparing an updated amount of source funds of the prospective recipient depository institution (when operating as a source institution) to the updated source fund amounts of other prospective recipient depository institutions (when operating as source institutions). One or more other parameters may also be used in selecting the one or more recipient depository institutions, such as an amount of funds already held in the prospective recipient depository institution by one or more of the client accounts, based at least in part on such considerations as insurance limits, and/or client designated amounts, and/or percentages to be held in a given recipient depository institution. Another parameter may comprise complying with a respective minimum cap and/or a respective maximum cap associated in the one or more databases with a respective depository institution.

The one or more computers 310 for the deposit management system may be further configured, in one or more embodiments, with program code for a transfer data generator 340 for generating recommended and/or actual withdrawal/transfer amount(s) and/or instructions and/or deposit/transfer amount(s) and/or instructions, to and/or from source institutions and/or recipient institutions. In embodiments, the system may generate recommended and/or actual instructions to be carried out by source institutions, agents of source institutions, intermediaries and/or others. In embodiments, intermediaries may up-load or provide instructions to be approved, executed and/or performed by others.

In one or more embodiments, the transfer data generator 340 is configured for generating transfer data reflecting a wire, Fax, email, or other prompt method of transfer of the one or more second withdrawal/transfer amounts using the overdraft facilities of the respective one or more aggregated transaction accounts of the respective one or more recipient depository institutions, with the timing such that withdrawal/transfer of the one or more second withdrawal/transfer amounts using the one or more overdraft facilities is to occur prior to a withdrawal/transfer of one or more third withdrawal/transfer amounts from the respective interest-bearing aggregated deposit account of the one or more respective one recipient depository institutions to the respective one or more transaction accounts with the overdraft facilities. The transfers may be directly to other institutions, or via one or more clearing accounts of one or more clearance institutions, or to payment entities, to name a few.

In one or more embodiments, this transfer data may be communicated directly or indirectly via another entity, to respective one or more of the recipient depository institutions. The communication may be made by wire, email, Fax or other electronic means, or by telephone or other prompt communication to the respective one or more recipient depository institutions to promptly or immediately or, in any event, prior to the transfer from the respective interest-bearing aggregated deposit account held therein, make a withdrawal/transfer from the overdraft facility for the respective aggregated transaction account of the respective recipient depository institution. In one or more embodiments, the withdrawn/transferred funds from a plurality of the recipient depository institutions may then be aggregated by the deposit management system 160 or by a clearing institution, using one or more computers, into one or more withdrawal/transfer amounts for deposit in one or more source institutions and/or recipient depository institutions and/or sent directly or indirectly to one or more payment vendors.

The amount of the first withdrawal/transfer may be determined based at least in part on one or more parameters. As noted, a need for a first withdrawal/transfer amount may be caused by a single negative net transfer amount for one source institution, or may be caused by multiple net transfer amounts from the same source institution that are netted to obtain the first withdrawal/transfer amount. Alternatively, a need for a first withdrawal/transfer amount may be caused by a netting of net transfer amounts from multiple different source institutions. The amount(s) for the one or more transfers for the one or more selected recipient depository institutions may be received electronically either in connection with a sweep file and/or separately, and/or may be received in person, over the telephone, by fax or other distribution means, and entered by keying or scanning such information, and/or the transfer amount(s) may be calculated based at least in part on one or more of the respective net transfer amounts, and/or the one or more transfer amount(s) may be verified, by the deposit management system 160. If the transfer information is calculated, it may be calculated based at least in part on one or more parameters. Examples of such parameters are set forth in U.S. Pat. No. 7,752,107, and U.S. application Ser. No. 12/638,544, filed on Dec. 15, 2009, which are hereby incorporated by reference in their entirety. As noted, such one or more parameters may be based at least in part on obtaining a target reciprocity for one or more source institutions, and/or based at least in part on complying with maximum caps and/or minimum caps, and or to comply with client or source instructions regarding amounts or percentages to be held in one or more of the recipient depository institutions, and/or to stay within insurance limits. The first withdrawal/transfer amount may be communicated to a selected recipient depository institution, or may be distributed amount among multiple selected recipient depository institutions.

The deposit management system 160, via the transfer data generator 340, also may, in one or more embodiments, generate transfer data, reflecting withdrawal/transfer by the respective one or more recipient depository institutions of a respective second withdrawal/transfer amount from the one or more interest-bearing aggregated deposit accounts in the respective one or more depository institutions to their respective transaction accounts in the respective recipient depository institutions to reconcile all or part of the overdraft from the respective aggregated transaction accounts of the selected recipient depository institutions. In one or more embodiments, the transfer data generator 340 may generate transfer data for each of one or more of the recipient depository institutions, which may comprise an instruction to transfer a respective second withdrawal/transfer amount comprising all or a portion of the first withdrawal/transfer amount that was allocated to the respective recipient depository institution, from one or more interest-bearing aggregated deposit accounts held by the respective recipient depository institution to the aggregated transaction account held by the respective recipient depository institution. In one or more embodiments, the withdrawal/transfer may be presented to the respective one depository institution in a manner that does not count against the 6 withdrawal limit imposed by Federal Reserve regulations, e.g., using one or more of the methods of: in person, or by mail, or by messenger, or by telephone and distributed by mail, or by automated teller machine, or a combination thereof. Alternatively, this transfer data may be communicated electronically. In one or more embodiments, the instructions for the third withdrawal/transfer amount from the interest-bearing aggregated deposit account may be provided by email or Fax or wire directly to the respective one depository institution, or to a messenger service for messenger delivery to the respective one recipient depository institution. Alternatively, the instructions for any of the withdrawals/transfers may be generated manually or generated by computer, and communicated to a source institution, or to an intermediary institution, or to another institution, that may, in turn, send the instruction to the one respective recipient depository institution, either directly or via a messenger.

The one or more computers 310 for the deposit management system may be further configured, in one or more embodiments, with program code to comprise an allocation and update component 350, for allocating, using the one or more computers, amounts of funds from multiple of the client accounts among multiple of the recipient depository institutions, so that the respective balance of funds for the one or more sub periods of time in each of the aggregated deposit accounts of the depository institutions, after taking into consideration the fund transfer amounts for the one or more sub periods of time, will substantially match a sum of the respective balances of funds from the multiple of the respective client accounts allocated to this respective aggregated deposit account. In one or more embodiments, the allocation information may be calculated based at least in part on one or more criteria. The component 350 may also update the one or more of the electronic databases with allocation information regarding funds of particular client accounts held in particular aggregated accounts at recipient institutions. In one or more embodiments, a record keeper performs such allocations and/or allocation calculations in accordance with one or more parameters.

A system bus 360 may further be provided to facilitate electronic data communication among the components.

Figure 4:
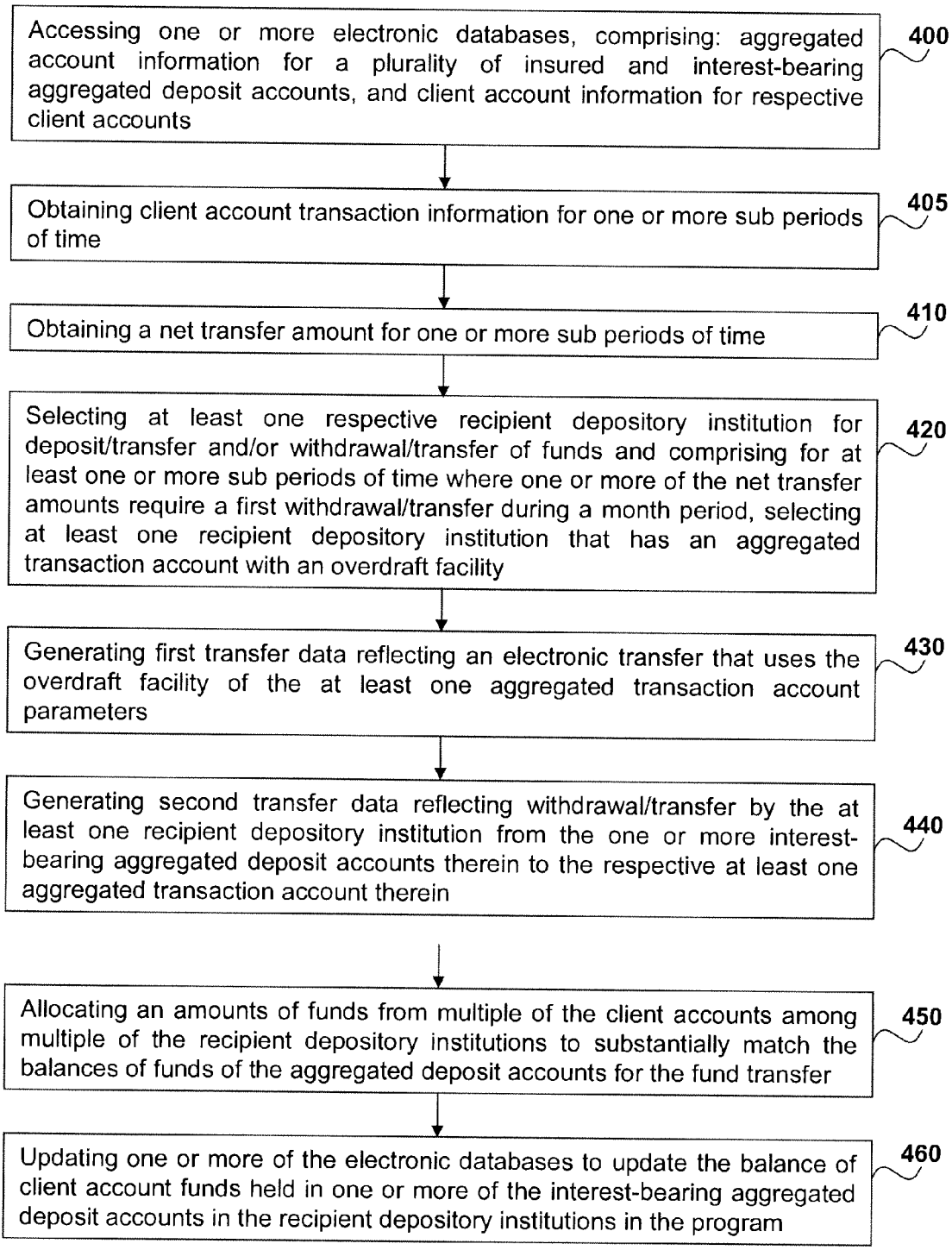
FIG. 4 is a schematic flow chart of an exemplary method in accordance with one or more embodiments of the invention.

An embodiment of a method of implementing the deposit management system of the invention is shown in FIG. 4. Note that the method may be performed in the context of a system that is only receiving withdrawal/transfer data, or may be performed in the context of a system that is receiving both withdrawal/transfer data and deposit/transfer data.

Block 400 comprises accessing, using one or more computers, one or more electronic databases, stored on one or more computer-readable media, as described previously, for carrying out one or more of the various operations of the system. For example, the one or more databases may comprises (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, with one or more of the recipient depository institutions with an interest-bearing aggregated deposit account having at least one associated aggregated transaction account having an overdraft facility; and (ii) client account information for each of a plurality of the respective client accounts comprising at least a respective balance of funds from the respective client account held in each of one or more recipient depository institutions in the interest-bearing aggregated deposit accounts holding funds of the respective client account;

Block 405 comprises an operation of obtaining client account transaction information comprising credit information and/or debit information applied to or against a respective client account for one or more sub periods of time and/or other transfer information. Note that the client account transaction information may be based at least in part on data from one or more respective source financial institutions. In one or more embodiments, the obtaining client account transaction information operation comprises receiving electronically a sweep file, and/or receiving client account transaction information in person, over the telephone, by fax or other distribution means and entering such information in the one or more databases by keying or scanning, and/or may be calculated, and/or may be verified by the deposit management system 160. In one or more embodiments, the client account transaction information may comprise a net of withdrawal/transfer amounts and/or deposit/transfer amounts from an individual client account over a period of time. The other transfer information may comprises transfer information from the management computer deposit management system 160 as part of a fund reallocation, or from another entity, for example.

Block 410 comprises an operation of obtaining, using the one or more computers, a respective net transfer amount for the one or more sub-periods of time for each of one or more of the respective source institutions. The respective net transfer amount for a respective source institution may be comprised of a net of withdrawal/transfer amounts and fund deposit/transfer amounts from the respective source institution that may be accumulated and netted. The net transfer amount may be calculated in whole or in part, using the one or more computers of the deposit management system, and/or may be received through one or more electronic communication networks, and/or may be received manually and keyed and/or scanned into the system. The source and manner of obtaining the respective net transfer amount is not limiting on the invention.

Block 420 comprises an operation of selecting at least one aggregated deposit account in one or more of the depository institutions to which to deposit/transfer or to withdraw/transfer funds to or from their respective one or more aggregated deposit accounts, and comprising, for at least one or more of the sub periods of time where the net transfer amount requires a first withdrawal/transfer amount during a month period, selecting at least one of the recipient depository institutions that has at least one aggregated transaction account with an overdraft facility based at least in part one or more selection rules. Note that this operation does not preclude other deposit/transfers and/or withdrawal/transfers during the month to other recipient depository institutions that do not maintain aggregated transaction accounts with overdraft facilities. For the operation of selecting for at least one or more of the sub periods of time where the net transfer amount requires a first withdrawal/transfer amount during a month period at least one of the recipient depository institution that has at least one aggregated transaction account with an overdraft facility, only one such recipient depository institution may be selected, or multiple recipient depository institution may be selected that have that have at least one aggregated transaction account with an overdraft facility.

In one or more embodiments, one of the selection rules may comprise obtaining a partial or substantially full reciprocity for source contributions of funds to the program, as described above. Another selection rule may comprise maintaining an amount of client account funds in a respective recipient depository institution at or below an insurance limit, or relative to a prescribed amount or percentage to be held in a respective depository institution. Another selection rule may comprise client account instructions. Another rule may comprise making a selection based when transfer information is received and/or processed relative to a cutoff time of the recipient depository institutions for fund transfers, and/or relative to one or more time threshold times, and/or relative to the cutoff times of one or more other of the depository institutions or entities involved in the fund transfer chain. Another selection rule may comprise selecting a recipient depository institution for a withdrawal/transfer or a deposit/transfer in order to comply with a respective minimum cap and/or respective maximum cap associated in the one or more databases with the respective insured and interest-bearing aggregated deposit accounts or associated with the respective depository institution or with another of the recipient depository institutions. Another selection rule may comprise minimizing a number of withdrawals/transfers and/or deposits/transfers in a month period to hold balances held in one or more of the insured and interest-bearing aggregated deposit accounts substantially stable for some period of time. Another selection rule may comprise complying with a Federal Banking regulation 6 withdrawal/transfer limit per month for one or more of the respective depository institutions. Another selection rule may comprise a selection or de-selection of one or more of the recipient depository institutions by one or more of the clients and/or the source institutions, or by the depository institutions, or by another entity.

It should be noted that the use of the overdraft facility by the program may vary substantially among source institutions and depository institutions. For example, because the use of the overdraft facility may extend the time in which the individual source institutions must submit these client account transaction information to later in the day, some source institutions may make it a practice to use the overdraft facility substantially every day of the month in which there is a net withdrawal from one or more depository institutions. Alternatively, some of the source institutions may follow procedures to avoid using the overdraft facility except as a failsafe option for emergencies. In such cases, the overdraft facility may be established to be available, but may only be drawn upon occasionally. The program may use selection rules to use the same depository institution for all overdrafts for a given period of the day (e.g., the morning, or the afternoon), or over a period of hours, or in a day, or over several days, or over a week, or over a month, for example. Alternatively, the program may use selection rules to use a different depository institution for each use of an overdraft facility. The program may be set up where only one or some of the depository institutions have an overdraft facility, or where all the deposition institutions have an overdraft facility. In embodiments where one or more of the depository institutions are affiliated with one or more source institutions in a program, the affiliated depository institutions may be set up with an overdraft facility. In such embodiments, the affiliated institutions may have greater flexibility to direct deposits towards the affiliated depository institutions.

Block 430 comprises generating first transfer data reflecting a wire or other electronic transfer that uses the overdraft facility of the at least one aggregated transaction account of the at least one recipient depository institution that was selected for the first withdrawal/transfer amount. The withdrawal/transfer of the first withdrawal/transfer amount using the respective overdraft facility is to occur prior to a partial or whole settlement of that respective overdraft from the one or more respective interest-bearing aggregated deposit accounts of the at least one recipient depository institution that was selected. In one or more embodiments, this operation comprises generating and sending directly to the recipient depository institution, using the one or more computers, an instruction to wire or otherwise electronically transfer the first withdrawal/transfer amount from an overdraft facility of its aggregated transaction account. In one or more embodiments, this operation comprises generating and sending to a broker-dealer or other source institution or other entity, using the one or more computers, an instruction to wire or otherwise electronically transfer the first withdrawal/transfer amount from an overdraft facility of the aggregated transaction account of one of the recipient depository institutions. In one or more embodiments, the transfers of the first amount may be directly to other institutions, or indirectly via one or more clearing accounts of one or more clearance institutions.

In one or more embodiments, this operation may further comprise aggregating a first withdrawal/transfer amount from one recipient depository institution with one or more other first withdrawal/transfer amounts from one or more other recipient depository institutions to obtain an aggregated amount, for subsequent transfer.

Block 440 represents an operation of generating second transfer data reflecting withdrawal/transfer by the at least one recipient depository institution of at least one second withdrawal/transfer amount from the one or more interest-bearing aggregated deposit accounts in the at least one depository institution that was selected to the respective at least one aggregated transaction account in the at least recipient depository institution that was selected in partial of full settlement of the overdraft.

In one or more embodiments, this operation comprises generating and communicating the second transfer data to have the second withdrawal/transfer amount comprising all or a portion of the first withdrawal/transfer amount withdrawn/transferred from the at least one recipient depository institution via the overdraft facility of its at least one aggregated transaction account, withdrawn/transferred from one or more of the interest-bearing aggregated deposit accounts held by the at least one recipient depository institution to the aggregated transaction account held by the at least one recipient depository institution in partial or full settlement of the respective overdraft. Note that in one or more embodiment, some of the funds for the partial or full settlement of the overdraft are withdrawn/transferred from one or more money funds, or other aggregated or non aggregated investment vehicles that are not insured. The source of funds to be used for the partial or full settlement of the overdraft is not limited.

In one or more embodiments, the second withdrawal/transfer instruction may be presented in a manner that does not count against the 6 withdrawal limit imposed by Federal Reserve regulations, e.g., presenting withdrawal/transfer instructions using one or more of the methods of: in person, or by mail, or by messenger, or by telephone and distributed by mail, or by automated teller machine, or a combination thereof. By way of example, the transfer information may be communicated to a messenger service for delivery by a messenger to the at least one recipient depository institution. In one or more embodiments, the transfer data may be generated by computer and emailed or faxed or wired or delivered in person, or otherwise communicated to the messenger service, for messenger delivery to the recipient depository institution. Note that in one or more embodiments, if a messenger does not deliver the transfer information before a prescribed time, then the recipient depository institution may transfer the allocated withdrawal/transfer amount from the insured and interest-bearing aggregated deposit account held by the recipient depository institution to the transaction account held by the recipient depository institution based at least in part on a transfer instruction wired or otherwise communicated to the recipient depository institution. Note that this withdrawal/transfer may count as one of the six withdrawals permitted per month from an interest-bearing account under Federal banking regulations.

Block 450 represents an operation of allocating, using the one or more computers, amounts of funds from multiple of the client accounts among multiple of the recipient depository institutions, so that the respective balance of funds for the one or more sub periods of time in each of the aggregated deposit accounts of the depository institutions, after taking into consideration the fund transfer amounts for the one or more sub periods of time, will substantially match a sum of the respective balances of funds from the multiple of the respective client accounts allocated to this respective aggregated deposit account. This operation may be considered, in one embodiment, a re-shuffling of client account amounts to substantially match the one or more transfers to the aggregated deposit accounts.

Block 460 comprises an operation of updating, using the one or more computers, one or more of the electronic databases to update the respective balances of client account funds held in one or more of the recipient depository institutions in one or more aggregated deposit accounts therein.

Note that the embodiments above may be implemented with any combination or all of the following features.

In one or more embodiments, an operation is performed of determining a respective one or more withdrawal/transfer amounts to one or more respective recipient depository institutions based, at least in part, on maintaining a target reciprocity for one or more of the recipient depository institutions in the deposit interchange program based at least in part on the fact of, or on an amount of source funds contributed to the program by the respective recipient depository institutions (when operating as source institutions), and held in interest-bearing aggregated deposit accounts, and in some embodiments, also in other investment accounts (which may be uninsured, e.g., money funds, etc.) in the program, in other of the recipient depository institutions in the program. In one or more embodiments, this target reciprocity may be complete reciprocity. In another embodiment, the target reciprocity may be determined based at least in part on one of more parameters, such as a total amount of source funds in the program from the respective recipient depository institution as compared to other recipient depository institutions, and/or as compared to one or more threshold amounts, and/or based at least in part on a total amount of source funds of a particular type contributed to the program from the respective recipient depository institutions (when operating as source institutions), e.g., municipal and/or state and/or Federal or other governmental funds, and/or based at least in part on a relationship parameter, and/or some other parameter.

In one or more embodiments, an operation is performed of determining at least one first withdrawal/transfer amount based, at least in part, on a net of deposit/transfer data and withdrawal/transfer data from one or more client accounts of one or more of the source institutions participating in the program and/or from the deposit management system 160 for fund reallocations.

In one or more embodiments, the client account transaction information comprises information for at least funds of one or more client accounts. In another embodiment, the client account transaction information comprises information for at least bank funds, or for only bank funds. In another embodiment, the client account transaction information comprises information for at least municipal or other governmental funds, or for only municipal or other governmental funds.

In one or more embodiments, the one or more computers 310 may be configured by programming code to administer clients' deposits/transfers to and/or withdrawals/transfers from client accounts associated with one or more of the source institutions. In one or more embodiments, the administering comprises processing transaction data comprising transaction data for one or more deposits/transfers for one or more client accounts and/or transaction data for one or more withdrawals/transfers from one or more of said client accounts, with the transaction data comprising a respective amount for each respective deposit/transfer and/or each respective withdrawal/transfer, and/or a net of such amounts over a period of time. For example, the transactions could include sweeps, checks, transfers to cover, e.g., securities transactions or margin accounts, debit card transactions, credit card transactions, on-line bill paying transactions, touch tone bill paying data, ACH transactions, wire transactions, other transfers, and/or nets thereof, to name a few. In such an embodiment, the one or more computers may then be used to calculate a respective net amount for each of one or more of the respective source institutions.

In one or more embodiments, an operation is performed of generating instructions and transmitting the instructions to a messenger service for delivery by messenger to the at least one recipient depository institution to have funds transferred from the interest-bearing aggregated deposit account of at least one respective recipient depository institution to the aggregated transaction account with the overdraft facility of the at least one recipient depository institution. In one or more embodiments, this operation may be performed manually.

In one or more embodiments, the transfer data generator 340 may be configured by programming code for generating and sending information to the at least one recipient depository institution by wire or other electronic communication, or by telephone, or by Fax, or other communication mode about a prospective withdrawal/transfer of funds from its one or more interest bearing aggregated deposit accounts to its respective transaction account in partial or full settlement of an overdraft. In one or more embodiments, this operation may be performed manually.

In one or more embodiments, each of a plurality of the interest-bearing aggregated deposit accounts has an associated transaction account with an overdraft facility. In a further embodiment, all of the recipient depository institutions in the program maintain at least one aggregated transaction account with an overdraft facility.

In one or more embodiments, the allocation engine 330 may be configured by programming code in the one or more computers, with one or more selection rules to select only recipient depository institutions with an insured and interest-bearing aggregated deposit account that have an associated aggregated transaction account with an overdraft facility, and that have a recorded security interest in the deposits of the respective interest-bearing aggregated deposit account of the selected respective recipient depository institution. In one or more embodiments, this operation may be performed manually.

In one or more embodiments, the allocation engine 330 may be configured by programming code in the one or more computers, with one or more selection rules to select, after a predetermined time of day, only recipient depository institutions with an interest-bearing aggregated deposit account and an aggregated transaction account with an overdraft facility. In one or more embodiments, this aggregated transaction account may have a recorded security interest in the deposits of the respective interest-bearing aggregated deposit account of the selected recipient depository institution. In one or more embodiments, these operations may be performed manually.

In one or more embodiments, the instruction for the wire transfer or other electronic transfer of the first withdrawal/transfer amount from the aggregated transaction account may require an immediate wire transfer from the overdraft facility upon receipt of the instruction.

In one or more embodiments, wherein there is a reciprocity target for at least one of the recipient depository institutions, and wherein one of the one or more selection rules comprises determining whether a prospective withdrawal/transfer or a deposit/transfer will comply with a respective maximum cap and/or a respective minimum cap associated with the prospective recipient depository institution or with another of the respective recipient depository institutions, the one or more computers 310 may be configured with programming code for performing a pseudo-transfer of a proposed transfer of the at least one second withdrawal/transfer amount to determine whether the reciprocity target for the at least one recipient depository institution will be met by the proposed transfer; and if the reciprocity target will not be met by the pseudo transfer and the resulting pseudo end balances that would be held in the respective recipient depository institutions, then changing one or more of the respective maximum caps and/or the respective minimum caps to change the at least one second withdrawal/transfer amount to the interest-bearing aggregated deposit account held in the at least one recipient depository institution that was selected. In one or more embodiments, this operation may be performed manually. This operation may be advantageous for the one or more embodiments where transfer to the interest-bearing aggregated deposit accounts held in the respective recipient depository institutions is controlled at least in part by maximum caps and/or minimum caps.

In one or more embodiments, the one or more computers 310 may be configured with programming code for generating and sending one or more instructions to a source institution to withdraw/transfer funds from the control operating account 125 held by the clearance bank 120 and to transfer those funds to one or more of the program source institutions and/or to one or more of the recipient depository institutions and/or to one or more payment entities. In one or more embodiments, a communication to the clearance bank by telephone, or by Fax, or in person, or other non-automated communication, may be performed.

In one or more embodiments, the one or more computers may be configured by programming code for making direct electronic communication with the control operating account 125 held by the clearance bank 120 to provide instructions to withdraw/transfer funds from the control operating account 125, and to send/transfer funds to one or more of the source institutions and/or to one or more of the recipient depository institutions and/or to one or more payment entities. In another embodiment, a communication to the clearance bank by telephone, or by Fax, or in person, or other non-automated communication, may be performed.

In one or more embodiments, the one or more computers may be configured with programming code for determining if an overdraft amount remains in the aggregated transaction account of at least one of the recipient depository institution at a time subsequent to a transfer of the one or more second withdrawal/transfer amounts, e.g., the next day, for example. In another embodiment, the one or more computers may be configured with programming code for performing a reconciliation process with the one or more transaction accounts of the respective recipient depository institutions to determine if there is an overdraft, and if so, to determine the overdraft amount for that respective aggregated transaction account, at a time subsequent (e.g., the next day) to sending the transfer data reflecting the second withdrawal/transfer amount made from the interest-bearing aggregated deposit account held in the respective recipient depository institution to the aggregated transaction account held by the respective recipient depository institution, to settle all or a portion of the overdraft. In one or more embodiments, data on overdraft amounts, overdraft limits/thresholds, and/or other records for the respective aggregated transaction accounts of the respective recipient depository institutions may be maintained in the one or more databases. In one or more embodiments, this operation may be performed manually.

In one or more embodiments, the allocation engine 330 may be configured, by programming code in the one or more computers, with one or more selection rules for selecting only recipient depository institutions with a government backed insured interest-bearing aggregated deposit account that has an associated transaction account with an overdraft facility that has a zero balance therein, and/or has no current overdraft, or for selecting an aggregated transaction account with an overdraft amount below a threshold level. In one or more embodiments, the deposit management system 160 may maintain data in the one or more databases on a respective positive or negative balance held in one or more of the respective aggregated transaction accounts. In one or more embodiments, this operation may be performed manually.

In one or more embodiments, the allocation engine 330 may be configured by programming code for determining multiple respective second withdrawal/transfer amounts to be allocated to respective recipient depository institutions, with each respective second withdrawal/transfer amount, based at least in part on one or more parameters. Example parameters have been set forth above, and may comprise reciprocity targets, maintaining maximum caps and/or minimum caps, maintaining client account funds fully insured, limiting fund transfers for one or more of the recipient depository institutions, to name a few. In one or more embodiments, this operation may be performed manually.

In another embodiment, the allocation engine 330 may be configured by programming code for selecting recipient depository institutions and/or determining amount(s) of the respective withdrawals/transfers from the selected recipient depository institutions, based at least in part, on respective fund transfer cutoff times for respective recipient depository institutions and/or source institutions, and/or processing cutoff times for other entities involved in the fund transfer. In one or more embodiments, this operation may be performed manually.

In one or more embodiments, the transfer data generator 340 may be configured with programming code for sending the transfer data to a source institution for subsequent transfer to one or more recipient depository institutions. In one or more embodiments, this operation may be performed manually.

In one or more embodiments, the program may use a plurality of control operating accounts at one or more clearance banks, to manage timing of deposit/transfers and withdrawals/transfer among the recipient depository institutions, the source institutions, and the payment entities.

As noted above, in one or more embodiments, a reverse wire draw-down operation may be used by a source institution, or by the deposit management system 160, or by another entity, to "pull" funds from one or more aggregated transaction accounts in respective recipient depository institutions with overdraft facilities, instead of initiating a "push" transfer via a wire or other electronic transfer, by the recipient depository institutions.

In yet another embodiment, a recipient depository institution, an intermediary institution, the deposit management system 160, and/or another entity, may perform a reverse wire draw-down operation to "pull" funds from one or more depository institutions/source institutions/clearance banks for a deposit/transfer to accelerate fund movement.

The present invention can be used in various kinds of deposit interchange programs and deposit sweep programs, as well as programs hereinafter developed. The present invention can also be used in the demand deposit marketplace, with insured deposit bank sweep products.

Note that the embodiment described in Ser. No. 13/032,456, filed on Feb. 22, 2011, titled "System, Method and Program Product for Administering Fund Movements Using Depository Institution Groups" may be combined with the embodiment using the overdraft facility of FIG. 4 to form a yet further embodiment. For example, in one or more embodiments, at least one of the one or more recipient depository institutions in a second group, per this Ser. No. 13/032,456, has an associated aggregated transaction account having an overdraft facility. In this embodiment, the generating transfer data reflecting a transfer of at least one second transfer amount from at least one selected recipient depository institution in the second group of one or more recipient depository institutions comprises: generating withdrawal/transfer data reflecting a wire or other electronic transfer of the at least one second transfer amount using the overdraft facility of the aggregated transaction account of the selected at least one recipient depository institution in the second group, with the withdrawal/transfer of the second transfer amount using the overdraft facility to occur prior to a withdrawal/transfer of a third withdrawal/transfer amount from the respective interest-bearing aggregated deposit account of the selected at least one recipient depository institution to its respective transaction account to settle in whole or in part the overdraft; and generating transfer data reflecting a transfer by the selected at least one recipient depository institution in the second group of the third withdrawal/transfer amount from the one or more interest-bearing aggregated deposit accounts in the selected at least one depository institution to the transaction account in the at least one recipient depository institution. In one or more embodiments, one or more of the second withdrawals/transfers may be directly or indirectly to one or more clearing accounts of one or more clearance institutions.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one or more embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are perfotined by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations. It should also be noted that the phrase "a plurality" is intended to mean more than one, and is not intended to refer to any previous recitation of the word "plurality," unless preceded by the word "the."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A method for administering a deposit sweep program, comprising:

accessing, by a deposit management computer system comprising one or more computers, one or more electronic databases stored on one or more computer-readable media, said one or more electronic databases comprising:

(i) aggregated account information for a plurality of government-backed insured and interest-bearing aggregated deposit accounts held in a plurality of recipient depository institutions, said aggregated account information comprising a balance of funds held in each of the aggregated deposit accounts, wherein each aggregated deposit account aggregates funds from a plurality of client accounts of one or more source institutions, and wherein at least one of the plurality of aggregated deposit accounts in at least one of the recipient depository institutions is associated with an aggregated transaction account having an overdraft facility;

(ii) client account information for each of the plurality of client accounts, said client account information comprising a balance of funds of each client account held in each of the aggregated deposit accounts of each of the recipient depository institutions holding funds of said each client account;

obtaining, by the deposit management computer system, client account transaction information for each of multiple of the client accounts of the one or more source institutions, the client account transaction information comprising credit information applied to and/or debit information applied against said each of the multiple of the client accounts for one or more sub-periods of time;

obtaining, by the deposit management computer system, a net transfer amount for the one or more sub-periods of time for each of one or more of the source institutions;

when one or more of the obtained net transfer amounts requires a first withdrawal/transfer amount, selecting, via the deposit management computer system, at least one aggregated deposit account to which to withdraw/transfer funds from, said selecting comprising, selecting the at least one aggregated deposit account associated with an aggregated transaction account having an overdraft facility, based at least in part on one or more selection rules including a selection rule that selects the at least one aggregated deposit account having a cutoff time which facilitates the timely movement of funds to the one or more source institutions;

generating first transfer data by the deposit management computer system, and communicating directly or indirectly at least one first transfer instruction to the at least one recipient depository institution holding the selected at least one aggregated deposit account with the associated aggregated transaction account having an overdraft facility, wherein the at least one first transfer instruction instructs the at least one recipient depository institution to wire or electronically transfer using the overdraft facility all or part of the first withdrawal/transfer amount from the aggregated transaction account associated with the selected at least one aggregated deposit account to the one or more source institutions prior to any partial or whole settlement of each overdraft from the selected at least one aggregated deposit account;

generating second transfer data by the deposit management computer system, and communicating directly or indirectly at least one second transfer instruction to the at least one recipient depository institution holding the selected at least one aggregated deposit account with the associated aggregated transaction account having an overdraft facility, wherein the at least one second transfer instruction instructs the at least one recipient depository institution to withdraw/transfer all or part of a second withdrawal/transfer amount from the selected at least one aggregated deposit account to its associated aggregated transaction account in partial or full settlement of the overdraft therein, wherein if a withdrawal/transfer limit has been met by the selected at least one aggregated deposit account during the one or more sub-periods of time, the at least one second transfer instruction is presented in person, by mail, by messenger, by telephone and distributed by mail, by automated teller machine, or a combination thereof, so that the selected at least one aggregated deposit account preserves its interest-bearing status;

reallocating, by the deposit management computer system, amounts of funds from multiple of the plurality of client accounts so that, after taking into consideration each net transfer amount, the balance of funds held in each of the aggregated deposit accounts matches a sum of the respective balances of funds of the client accounts allocated to said each of the aggregated deposit accounts; and updating, by the deposit management computer system, said each balance of funds of said each client account of the multiple of the client accounts after and based at least in part on the reallocating step.

2. The method as defined in claim 1,
wherein the selecting of the at least one aggregated deposit account associated with an aggregated transaction account having an overdraft facility comprises selecting multiple of such aggregated deposit accounts, from multiple of the recipient depository institutions; and
wherein the communicating comprises communicating directly or indirectly the at least one first transfer instruction to each of the multiple of the recipient depository institutions.

3. The method as defined in claim 2, further comprising:
aggregating partial first withdrawal/transfer amounts associated with each of the at least one first transfer instructions communicated to each of the multiple recipient depository institutions to obtain an aggregated amount, for subsequent transfer to the source institution requiring the first withdrawal/transfer amount.

4. The method as defined in claim 1, wherein the at least one recipient depository institution holding the at least one aggregated deposit account associated with an aggregated transaction account having an overdraft facility is also one of the source institutions and the one or more selection rules includes a selection rule that selects the at least one aggregated deposit account at least in part based on obtaining a partial or full reciprocity for source funds contributed by the at least one recipient depository institution to the deposit sweep program and held in one or more aggregated deposit accounts of one or more other recipient depository institutions.

5. The method as defined in claim 1, wherein the at least one recipient depository institution holding the at least one aggregated deposit account associated with an aggregated transaction account having an overdraft facility is also one of the source institutions and the one or more selection rules includes a selection rule that selects the at least one aggregated deposit account at least in part based on an amount of source funds of the at least one recipient depository institution held in one or more aggregated deposit accounts of one or more other the recipient depository institutions relative to an amount of source funds of another recipient depository institution held in the one or more aggregated deposit accounts of the one or more other recipient depository institutions.

6. The method as defined in claim 1, wherein the one or more selection rules includes a selection rule that selects the at least one aggregated deposit account at least in part based on whether an amount of client account funds of a particular one of the client accounts already held in the at least one recipient depository institution will exceed a threshold amount and/or client account instructions for the particular one of the client accounts.

7. The method as defined in claim 1, wherein the one or more selection rules includes a selection rule that selects the at least one aggregated deposit account at least in part based on maintaining a target reciprocity for one or more of the recipient depository institutions based at least in part on an amount of source funds contributed to the deposit sweep program by the one or more recipient depository institutions.

8. The method as defined in claim 1, wherein the one or more selection rules includes a selection rule that selects the at least one aggregated deposit account at least in part based on whether a transfer of the withdrawal/transfer amount, associated with the at least one first transfer instruction, will comply with a maximum cap and/or a minimum cap associated with the at least one recipient depository institution.

9. The method as defined in claim 1,
wherein one or more of the at least one recipient depository institution holding the at least one aggregated deposit account associated with an aggregated transaction account having an overdraft facility is also one of the source institutions and has a reciprocity target, and
wherein the one or more selection rules includes a selection rule that determines whether a transfer of the withdrawal/transfer amount, associated with the at least one first transfer instruction, will comply with a maximum cap and/or a minimum cap associated with the one or more of the at least one recipient depository institution, and
the method further comprising:
performing a pseudo-transfer of the withdrawal/transfer amount, associated with the at least one first transfer instruction, to determine whether the reciprocity target for the one or more of the at least one recipient depository institution will be met by the pseudo-transfer; and
if the reciprocity target will not be met, then changing the maximum cap and/or the minimum cap for the one or more of the at least one recipient depository institution to change the withdrawal/transfer amount associated with the at least one first transfer instruction.

10. The method as defined in claim 1, wherein the obtaining of the net transfer amount for said each of the one or more source institutions comprises calculating a net of one or more client account deposit/transfer amounts and one or more client account withdrawal/transfer amounts.

11. The method as defined in claim 1, wherein the communicating of the at least one second transfer instruction comprises providing the at least one second transfer instruction for presentation by a messenger.

12. The method as defined in claim 1, wherein the first withdrawal/transfer amount and the second withdrawal/transfer amount are equal for the at least one recipient depository institution holding the selected at least one aggregated deposit account.

13. The method as defined in claim 1, wherein one or more of the government backed-insured interest-bearing aggregated deposit accounts is insured by the Federal Deposit Insurance Corporation.

14. The method as defined in claim 1,
wherein the at least one first transfer instruction instructs the at least one recipient depository institution to make an immediate wire transfer of said all or said part of the first withdrawal/transfer amount using the overdraft facility from the aggregated transaction account associated with the selected at least one aggregated deposit account.

15. The method as defined in claim 14,
wherein the communicating of the at least one second transfer instruction comprises transmitting the at least one second transfer instruction by wire instructions to a delivery service for delivery by a messenger.

16. The method as defined in claim 1, wherein the client account transaction information comprises one or more deposit/transfer amounts and/or withdrawal/transfer amounts or nets thereof of one or more client accounts.

17. The method as defined in claim 1, wherein the client account transaction information comprises information for at least funds of one of the source institutions that is one of the recipient depository institutions.

18. The method as defined in claim 1,
wherein the client account transaction information is obtained by processing, by the deposit management computer system, client account transaction data comprising transaction data for one or more deposits/transfers to one or more of the client accounts and/or transaction data for one or more withdrawals/transfers from one or more of the client accounts, said transaction data comprising an amount for each deposit/transfer and each withdrawal/transfer and/or a net of one or more of said deposit/transfer amounts and said withdrawal/transfer amounts over a period of time, and
wherein the obtaining of the net transfer amount for said each of the one or more source institutions comprises calculating, by the deposit management computer, a net of the one or more deposit/transfer amounts and the one or more withdrawal/transfer amounts from said each of the multiple of the client accounts.

19. The method as defined in claim 1, wherein each of multiple of the aggregated deposit accounts has an associated aggregated transaction account with an overdraft facility.

20. The method as defined in claim 1, wherein the one or more selection rules includes a selection rule that selects the at least one aggregated deposit account only if the at least one recipient depository institution has a recorded security interest in deposits of the at least one aggregated deposit account held therein.

21. The method as defined in claim 1, further comprising:
generating one or more instructions to one of the source institutions to withdraw/transfer funds to one or more payment entities.

22. The method as defined in claim 1, further comprising:
determining if an overdraft remains in the associated aggregated transaction account of the at least one recipient depository institution at a time subsequent to a transfer of said all or said part of the second withdrawal/transfer amount from the selected at least one aggregated deposit account held therein.

23. The method as defined in claim 1, wherein the one or more selection rules includes a selection rule that selects the at least one aggregated deposit account only from the at least one of the recipient depository institutions holding an aggregated deposit account with an associated aggregated transaction account that has an overdraft balance of less than a threshold amount.

24. The method as defined in claim 1, further comprising:
maintaining data in the one or more electronic databases on a positive or negative balance of each associated aggregated transaction account having an overdraft facility.

25. The method as defined in claim 1, wherein the communicating of the at least one second transfer instruction comprises communicating to a broker-dealer the at least one second transfer instruction reflecting withdrawal/transfer by the at least one recipient depository institution of said all or said part of the second withdrawal/transfer amount.

26. The method as defined in claim 1, wherein the at least one first transfer instruction reflects a wire or electronic transfer, using the overdraft facility, said all or said part of the first withdrawal/transfer amount from the aggregated transaction account associated with the selected at least one aggregated deposit account to one or more clearance accounts in one or more clearance institutions of the one or more source institutions.

27. The method as defined in claim 26, further comprising:
making direct telephone or electronic communication with one of the one or more clearance institutions to provide instructions to withdraw/transfer funds from the one or more clearance account therein to the one or more of the source institutions and/or to one or more of the recipient depository institutions and/or to one or more payment entities.

28. The method as defined in claim 1, further comprising, withdrawing/transferring at least some of the funds for the second withdrawal/transfer amount for the partial or full settlement of the overdraft from one or more money funds.

29. The method as defined in claim 1, further comprising, withdrawing/transferring at least some of the funds for the second withdrawal/transfer amount for the partial or full settlement of the overdraft from one or more aggregated investment vehicles that are not insured.

30. The method as defined in claim 1, wherein the one or more selection rules includes a selection rule that selects the at least one aggregated deposit account at least in part based on directing the net transfer amount for at least one of the source institutions to a recipient depository institution that is affiliated with the at least one source institution.

31. The method as defined in claim 1, further comprising:
transferring electronically, by the deposit management computer system, an amount of funds based at least in part on the at least one first transfer instruction using the overdraft facility of the aggregated transaction account associated with the selected at least one aggregated deposit account prior to said partial or said whole settlement of said each overdraft from the selected at least one aggregated deposit account.

32. The method as defined in claim 1, wherein the one or more selection rules includes a selection rule that selects the at least one aggregated deposit account while avoiding any deselected recipient depository institution.

33. A deposit management computer system for administering a deposit sweep program, comprising:
one or more computers comprising memory wherein the memory stores computer-readable instructions comprising program code that, when executed, cause the one or more computers to perform the steps of:
accessing one or more electronic databases stored on one or more computer-readable media, said one or more electronic databases comprising:
(i) aggregated account information for a plurality of government-backed insured and interest-bearing aggregated deposit accounts held in a plurality of recipient depository institutions, said aggregated account information comprising a balance of funds held in each of the aggregated deposit accounts, wherein each aggregated deposit account aggregates funds from a plurality of client accounts of one or more source institutions, and wherein at least one of the plurality of aggregated deposit accounts in at least one of the recipient depository institutions is associated with an aggregated transaction account having an overdraft facility;

(ii) client account information for each of the plurality of client accounts, said client account information comprising a balance of funds of each client account held in each of the aggregated deposit accounts of each of the recipient depository institutions holding funds of said each client account;

obtaining client account transaction information for each of multiple of the client accounts of the one or more source institutions, the client account transaction information comprising credit information applied to and/or debit information applied against said each of the multiple of the client accounts for one or more sub-periods of time;

obtaining a net transfer amount for the one or more sub-periods of time for each of one or more of the source institutions;

when one or more of the obtained net transfer amounts requires a first withdrawal/transfer amount, selecting at least one aggregated deposit account to which to withdraw/transfer funds from, said selecting comprising, selecting the at least one aggregated deposit account associated with an aggregated transaction account having an overdraft facility, based at least in part on one or more selection rules including a selection rule that selects the at least one aggregated deposit account having a cutoff time which facilitates the timely movement of funds to the one or more source institutions;

generating first transfer data and communicating directly or indirectly at least one first transfer instruction to the at least one recipient depository institution holding the selected at least one aggregated deposit account with the associated aggregated transaction account having an overdraft facility, wherein the at least one first transfer instruction instructs the at least one recipient depository institution to wire or electronically transfer using the overdraft facility all or part of the first withdrawal/transfer amount from the aggregated transaction account associated with the selected at least one aggregated deposit account to the one or more source institutions prior to any partial or whole settlement of each overdraft from the selected at least one aggregated deposit account;

generating second transfer data and communicating directly or indirectly at least one second transfer instruction to the at least one recipient depository institution holding the selected at least one aggregated deposit account with the associated aggregated transaction account having an overdraft facility, wherein the at least one second transfer instruction instructs the at least one recipient depository institution to withdraw/transfer all or part of a second withdrawal/transfer amount from the selected at least one aggregated deposit account to its associated aggregated transaction account in partial or full settlement of the overdraft therein, wherein if a withdrawal/transfer limit has been met by the selected at least one aggregated deposit account during the one or more sub-periods of time, the at least one second transfer instruction is presented in person, by mail, by messenger, by telephone and distributed by mail, by automated teller machine, or a combination thereof, so that the selected at least one aggregated deposit account preserves its interest-bearing status;

reallocating amounts of funds from multiple of the plurality of client accounts so that, after taking into consideration each net transfer amount, the balance of funds held in each of the aggregated deposit accounts matches a sum of the respective balances of funds of the client accounts allocated to said each of the aggregated deposit accounts; and updating said each balance of funds of said each client account of the multiple of the client accounts after and based at least in part on the reallocating step.

34. The system as defined in claim 33, wherein the memory further stores computer-readable instructions comprising program code that, when executed, cause the one or more computers to perform the step of:

transferring electronically an amount of funds based on the at least one first transfer instruction using the overdraft facility of the aggregated transaction account associated with the selected at least one aggregated deposit account, prior to said partial or said whole settlement of said each overdraft from the selected at least one aggregated deposit account.

35. The system as defined in claim 33, wherein the one or more selection rules includes a selection rule that selects the at least one aggregated deposit account while avoiding any deselected recipient depository institution.

\* \* \* \* \*